Feb. 9, 1954 N. I. HALL ET AL 2,668,931

ELECTRONIC REGISTER FOR TELEPHONE SWITCHING SYSTEMS

Filed Dec. 20, 1949 10 Sheets-Sheet 1

INVENTORS N. I. HALL
G. HECHT
C. D. KOECHLING

BY J. W. Schmied

ATTORNEY

Feb. 9, 1954 N. I. HALL ET AL 2,668,931

ELECTRONIC REGISTER FOR TELEPHONE SWITCHING SYSTEMS

Filed Dec. 20, 1949 10 Sheets-Sheet 2

INVENTORS N. I. HALL
G. HECHT
C. D. KOECHLING
BY J. W. Schmied
ATTORNEY

ELECTRONIC REGISTER FOR TELEPHONE SWITCHING SYSTEMS

Filed Dec. 20, 1949 10 Sheets-Sheet 3

INVENTORS N. I. HALL
G. HECHT
C. D. KOECHLING
BY J. W. Schmied
ATTORNEY

ELECTRONIC REGISTER FOR TELEPHONE SWITCHING SYSTEMS

Filed Dec. 20, 1949 10 Sheets-Sheet 4

INVENTORS N. I. HALL
G. HECHT
C. D. KOECHLING
BY J W Schmied
ATTORNEY

ELECTRONIC REGISTER FOR TELEPHONE SWITCHING SYSTEMS

Filed Dec. 20, 1949 10 Sheets-Sheet 5

INVENTORS N. I. HALL
G. HECHT
C. D. KOECHLING
BY J. W. Schmied
ATTORNEY

ELECTRONIC REGISTER FOR TELEPHONE SWITCHING SYSTEMS

Filed Dec. 20, 1949 10 Sheets-Sheet 6

INVENTORS N. I. HALL
G. HECHT
C. D. KOECHLING
BY J. W. Schmied
ATTORNEY

ELECTRONIC REGISTER FOR TELEPHONE SWITCHING SYSTEMS

Filed Dec. 20, 1949 10 Sheets-Sheet 7

INVENTORS N. I. HALL
G. HECHT
C. D. KOECHLING
BY J W Schmied
ATTORNEY

Feb. 9, 1954 N. I. HALL ET AL 2,668,931

ELECTRONIC REGISTER FOR TELEPHONE SWITCHING SYSTEMS

Filed Dec. 20, 1949 10 Sheets-Sheet 8

INVENTORS N. I. HALL
G. HECHT
C. D. KOECHLING

BY J. W. Schmied

ATTORNEY

ELECTRONIC REGISTER FOR TELEPHONE SWITCHING SYSTEMS

Filed Dec. 20, 1949 10 Sheets-Sheet 9

INVENTORS N. I. HALL
G. HECHT
C. D. KOECHLING
BY
J. W. Schmied
ATTORNEY

ELECTRONIC REGISTER FOR TELEPHONE SWITCHING SYSTEMS

Filed Dec. 20, 1949 10 Sheets-Sheet 10

INVENTORS N. I. HALL
G. HECHT
C. D. KOECHLING

BY J. W. Schmied
ATTORNEY

Patented Feb. 9, 1954 2,668,931

UNITED STATES PATENT OFFICE 2,668,931

ELECTRONIC REGISTER FOR TELEPHONE SWITCHING SYSTEMS

Nathan I. Hall, West Los Angeles, Calif., and George Hecht, Astoria, and Charles D. Koechling, Floral Park, N. Y., assignors to Bell Telephone Laboratories, Incorporated, New York, N. Y., a corporation of New York Application December 20, 1949, Serial No. 134,107

26 Claims. (Cl. 315—163)

This invention relates to telephone switching systems, and more particularly to circuits and apparatus for counting and storing dial pulses and for performing control functions in response thereto.

An object of this invention is to provide an electronic dial pulse counting, storing and responsive system of high efficiency and rapidity of operation.

Another object of this invention is to provide an electronic register capable of properly responding to a plurality of diverse normal and abnormal conditions.

A feature of this invention is a pulse counting chain embodying certain novel provisions.

Another feature of this invention is an electronic counting chain for counting the dial pulses representing each digit of a telephonic designation and electronic storing means for storing the successive digital representations.

Another feature of this invention is an electronic progress means operable successively to associate a pulse counting chain with several electronic digit registers.

A further feature of this invention is an electronic control means operative at the first dial pulse representing each digit and another electronic control means operative at the end of the dial pulses representing each digit of a telephonic designation.

Another feature of this invention is an electronic means operative in response to the receipt of pulses representing a selectable first digit for preventing the counting or storing of subsequent dial pulses.

Another feature of this invention is an electronic means operative in response to the receipt of pulses representing a selectable first digit for clearing the counting and storing means of that digital representation and for thereafter permitting subsequent dial pulses to be counted and stored.

Figures 1, 11:
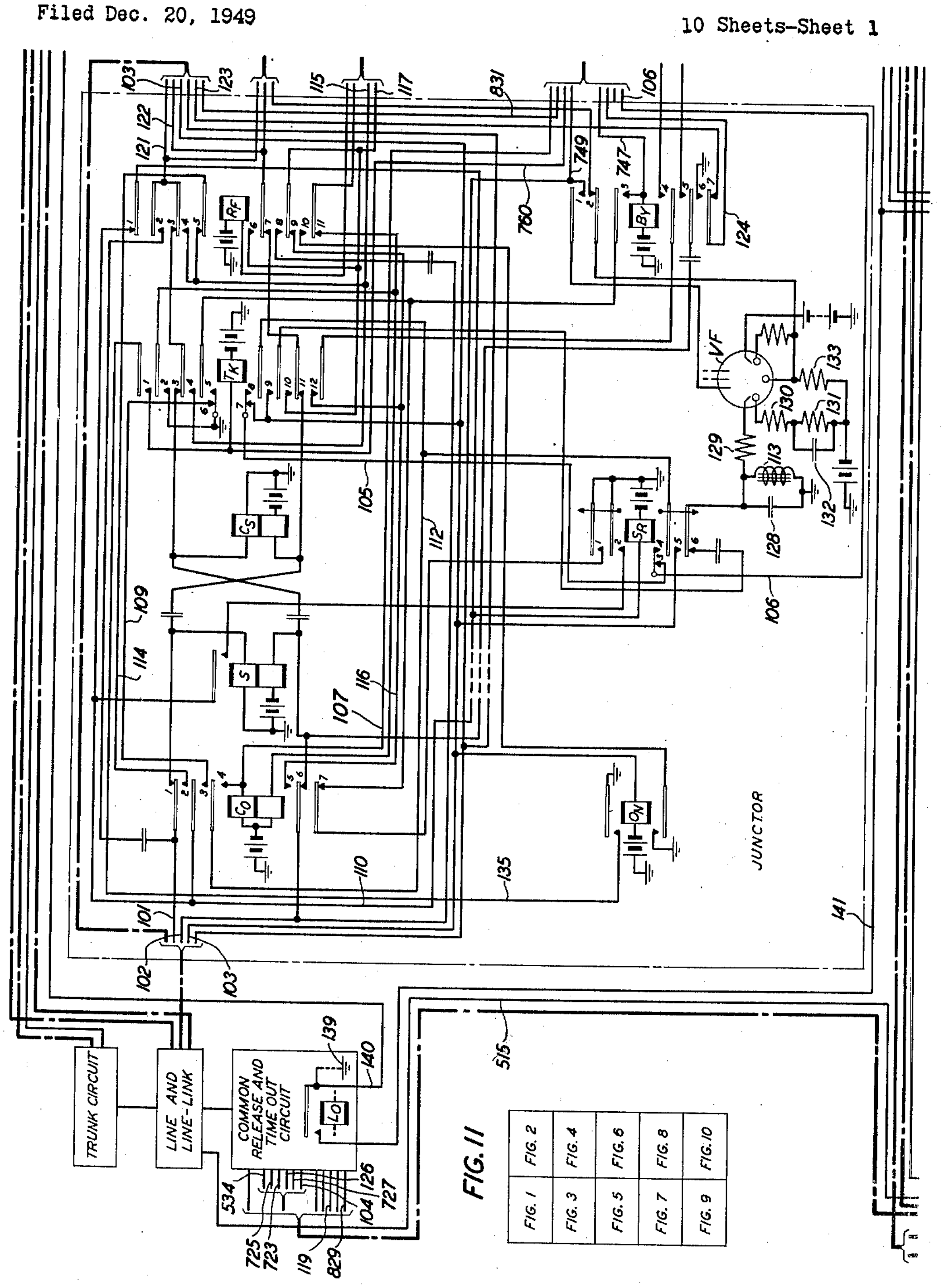
Figure 2:
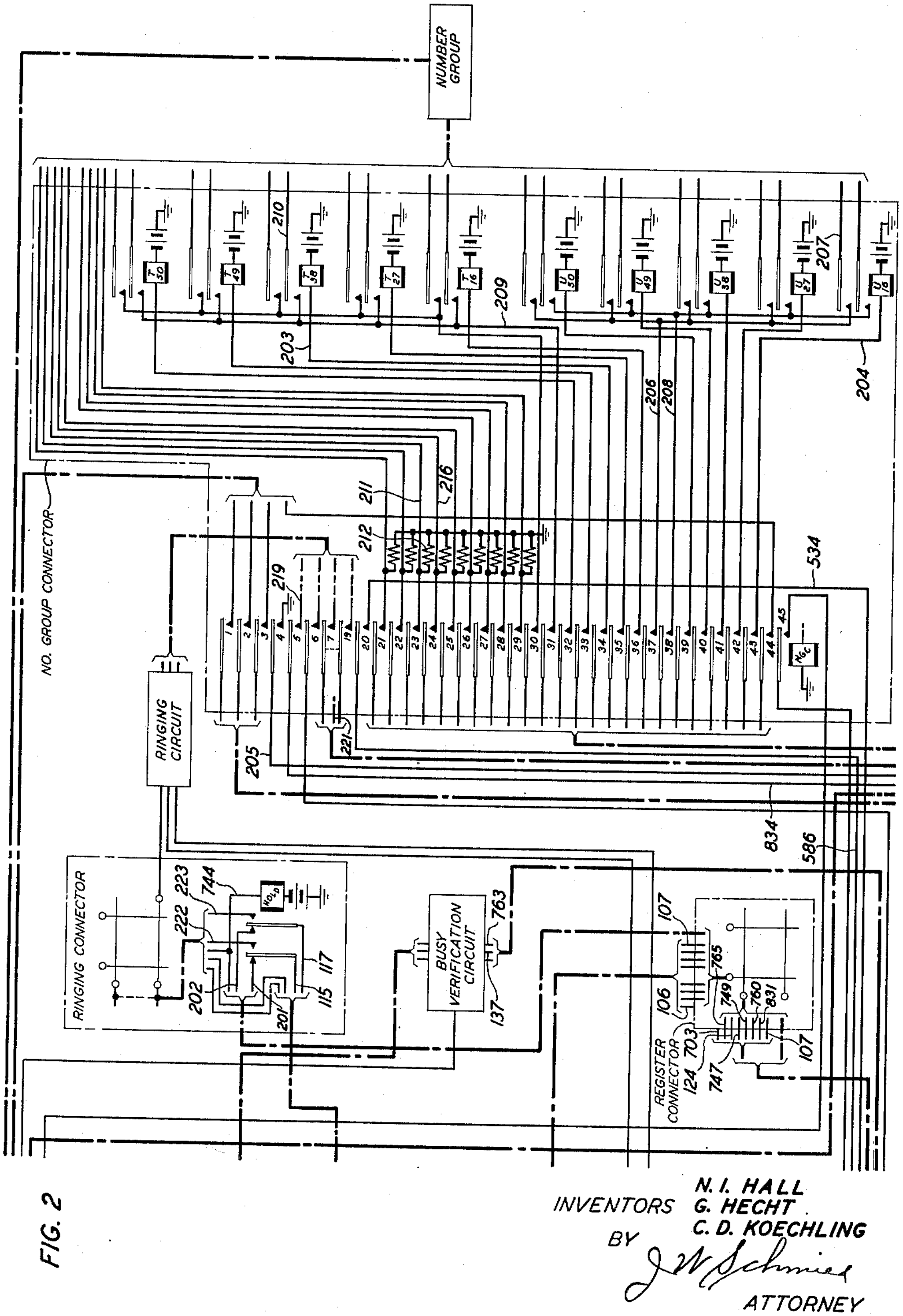
Figure 3:
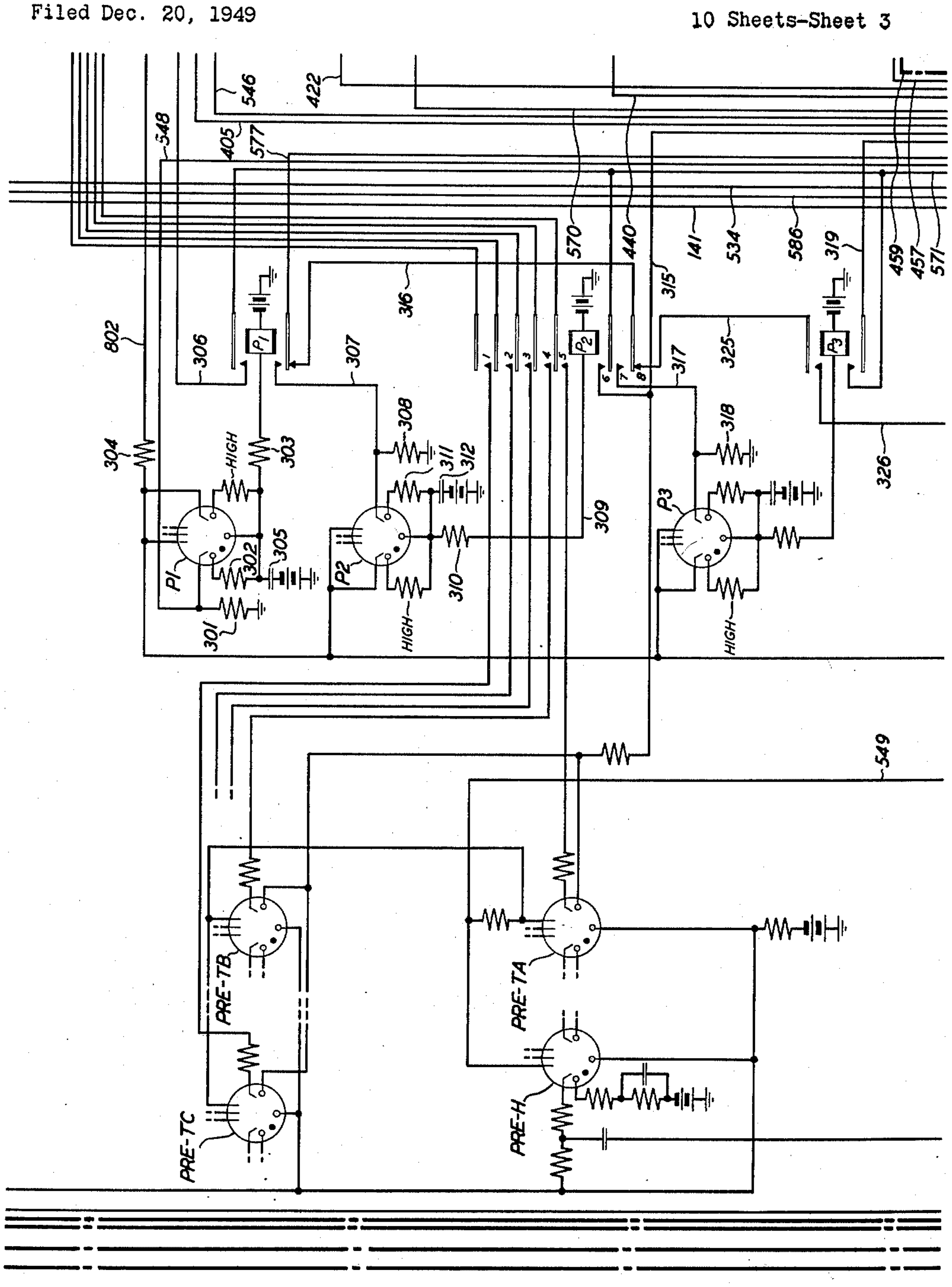
Figure 4:
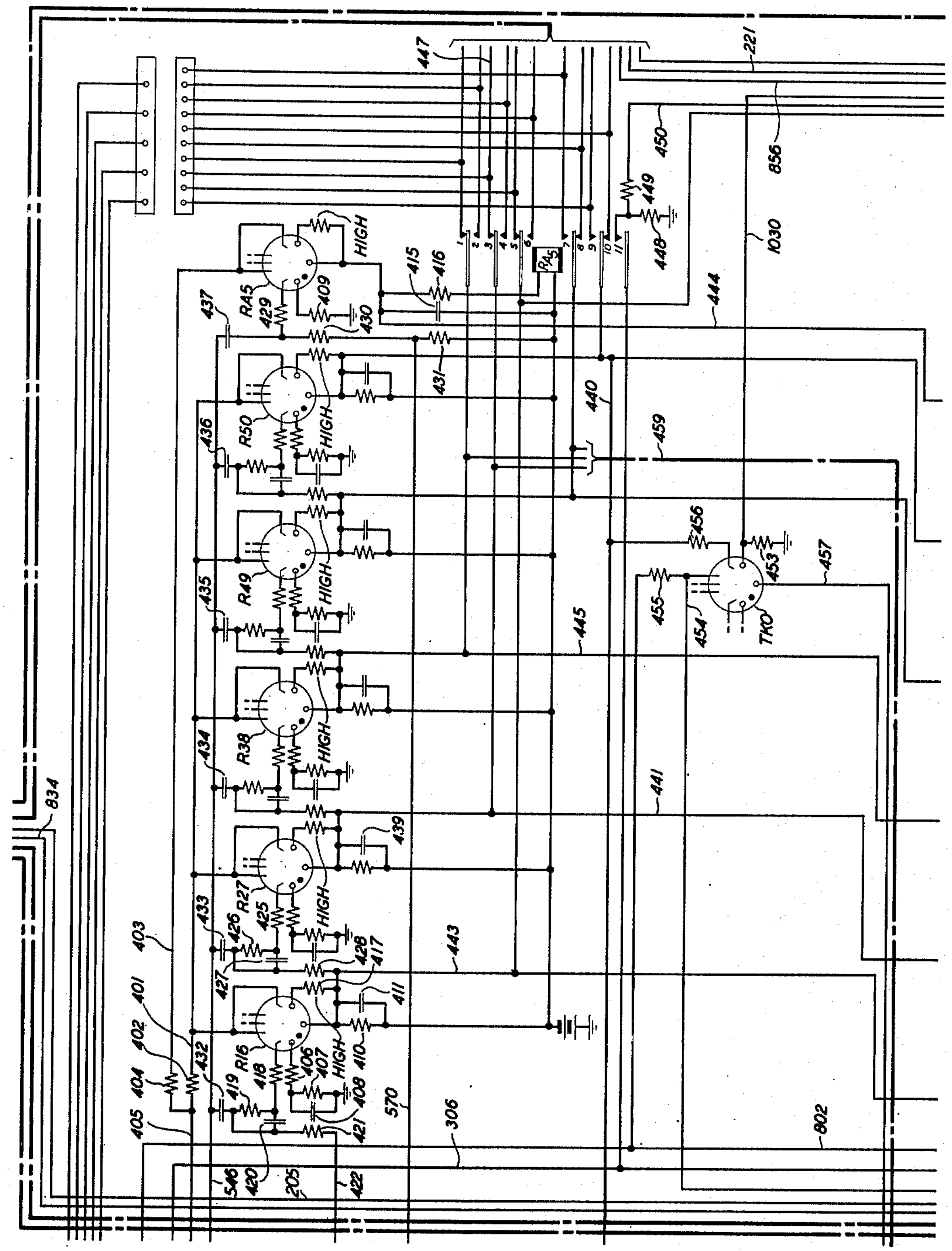
Figure 5:
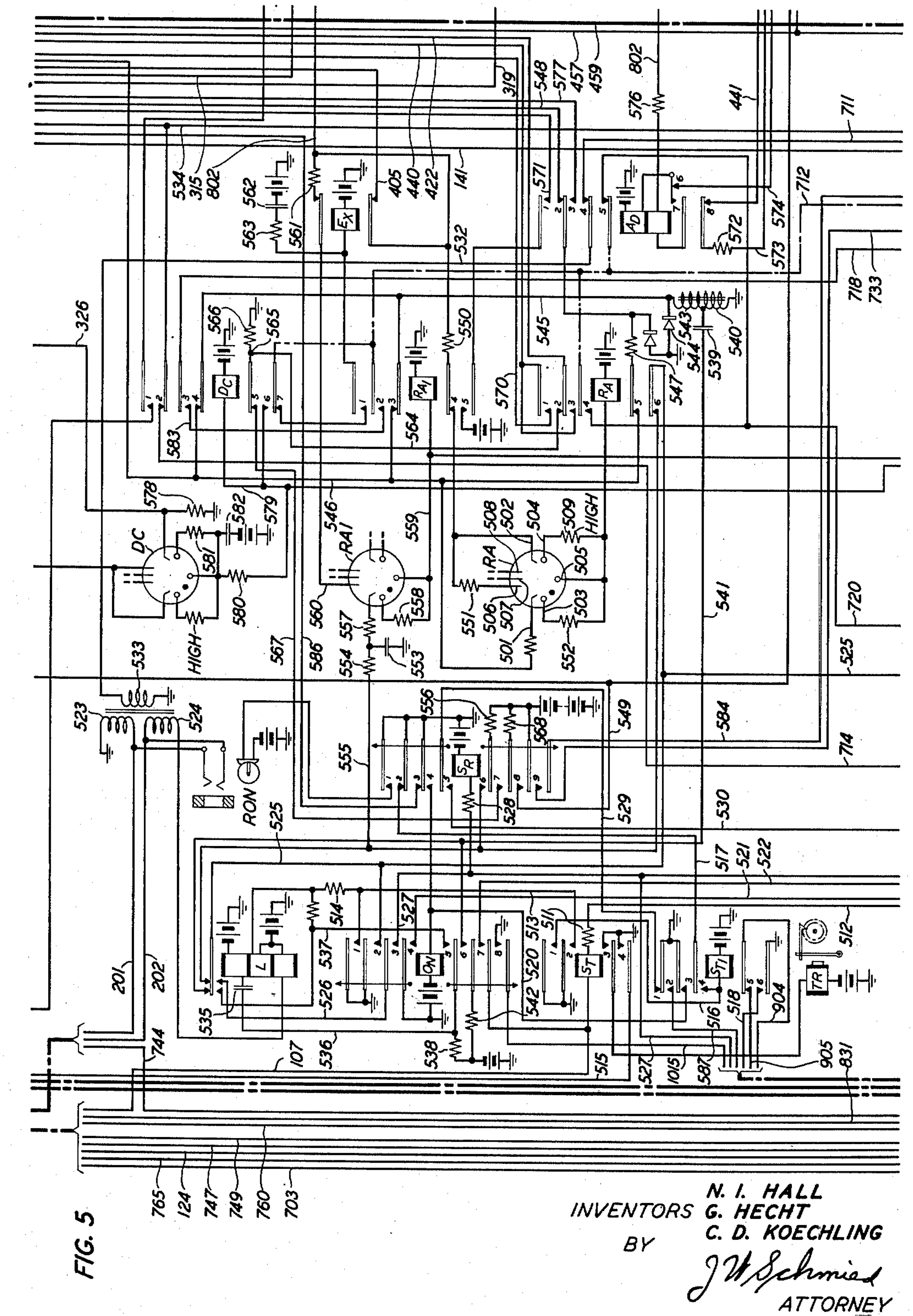
Figure 6:
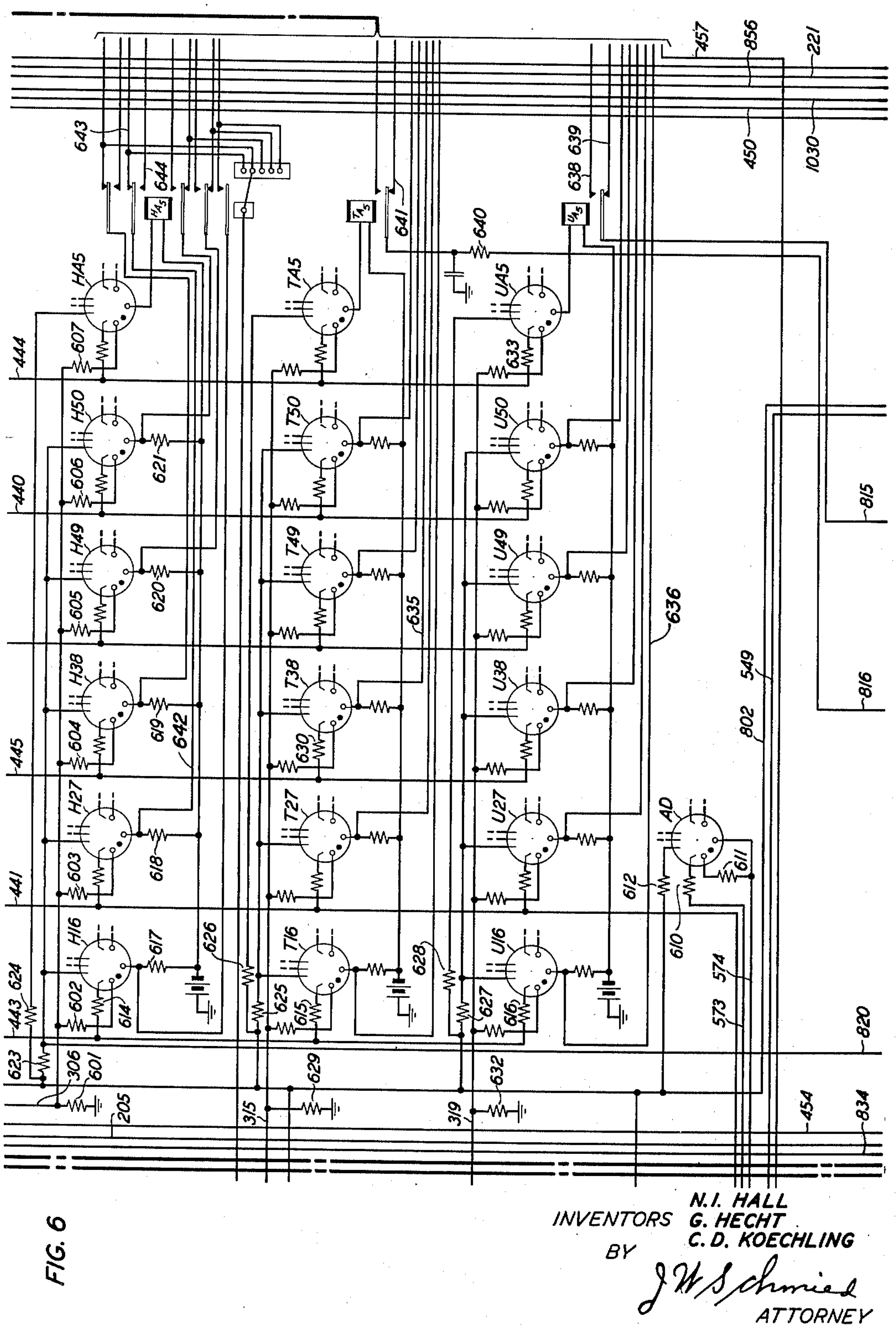
Figure 7:
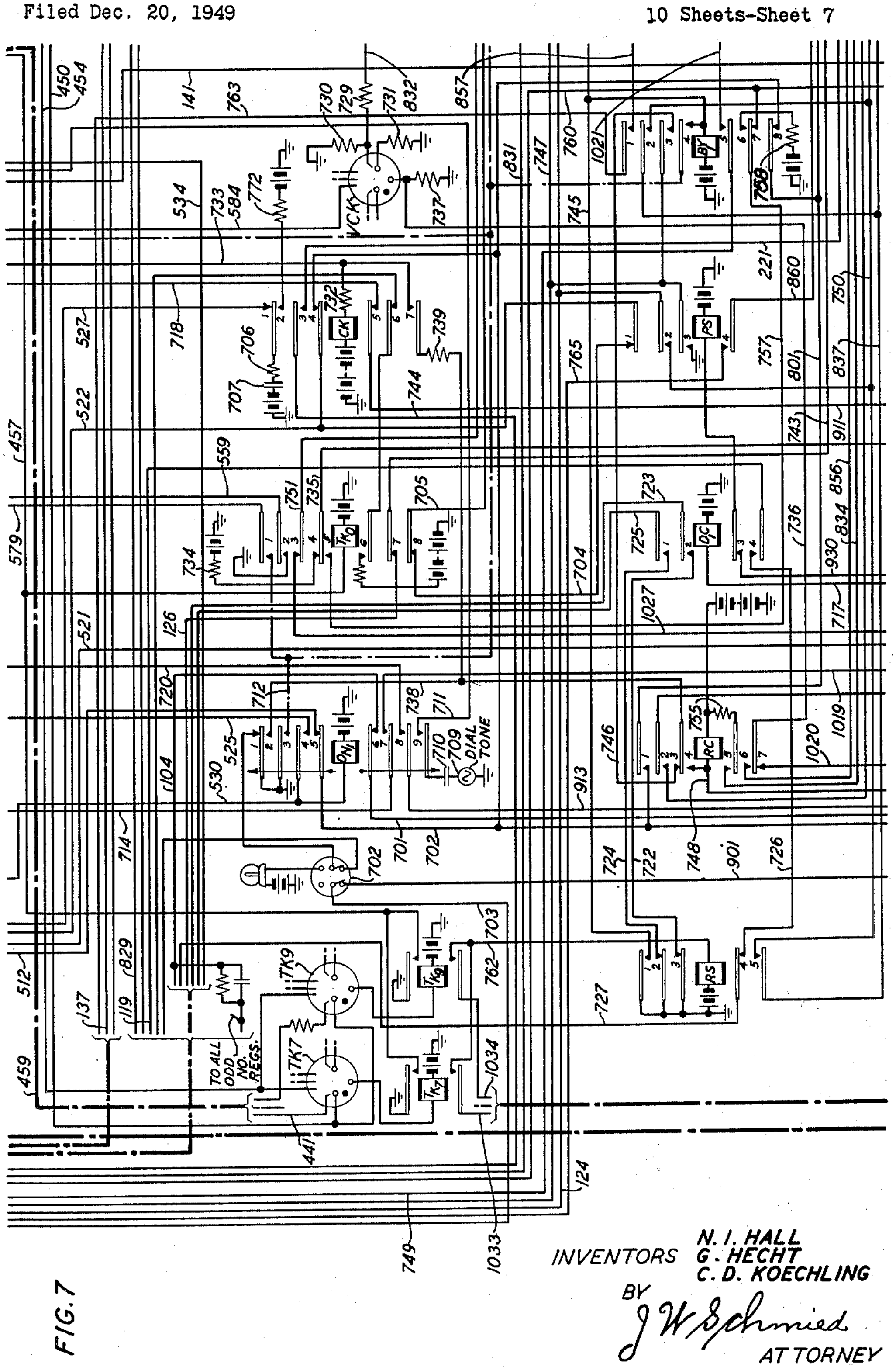
Figure 8:
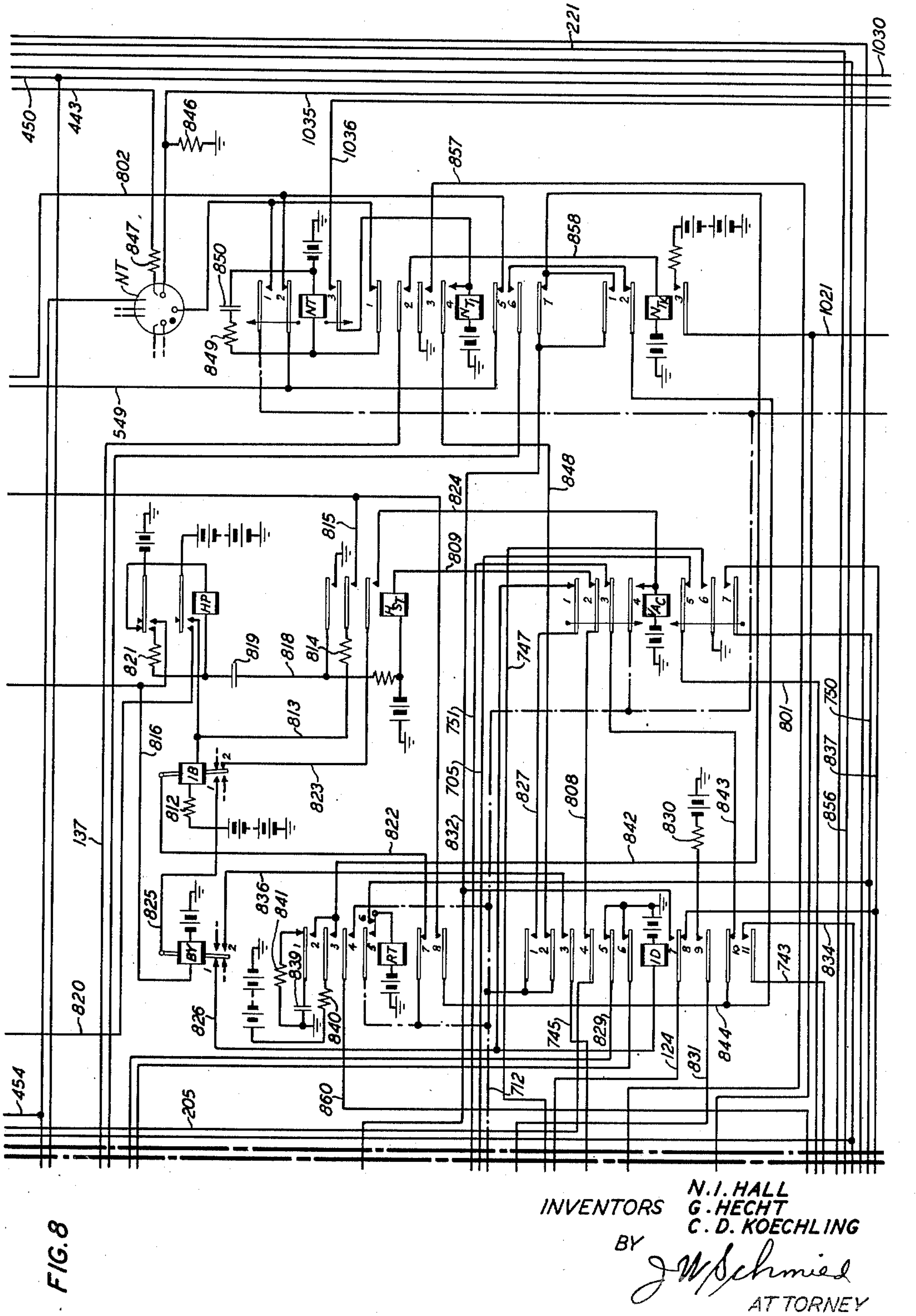
Figure 9:
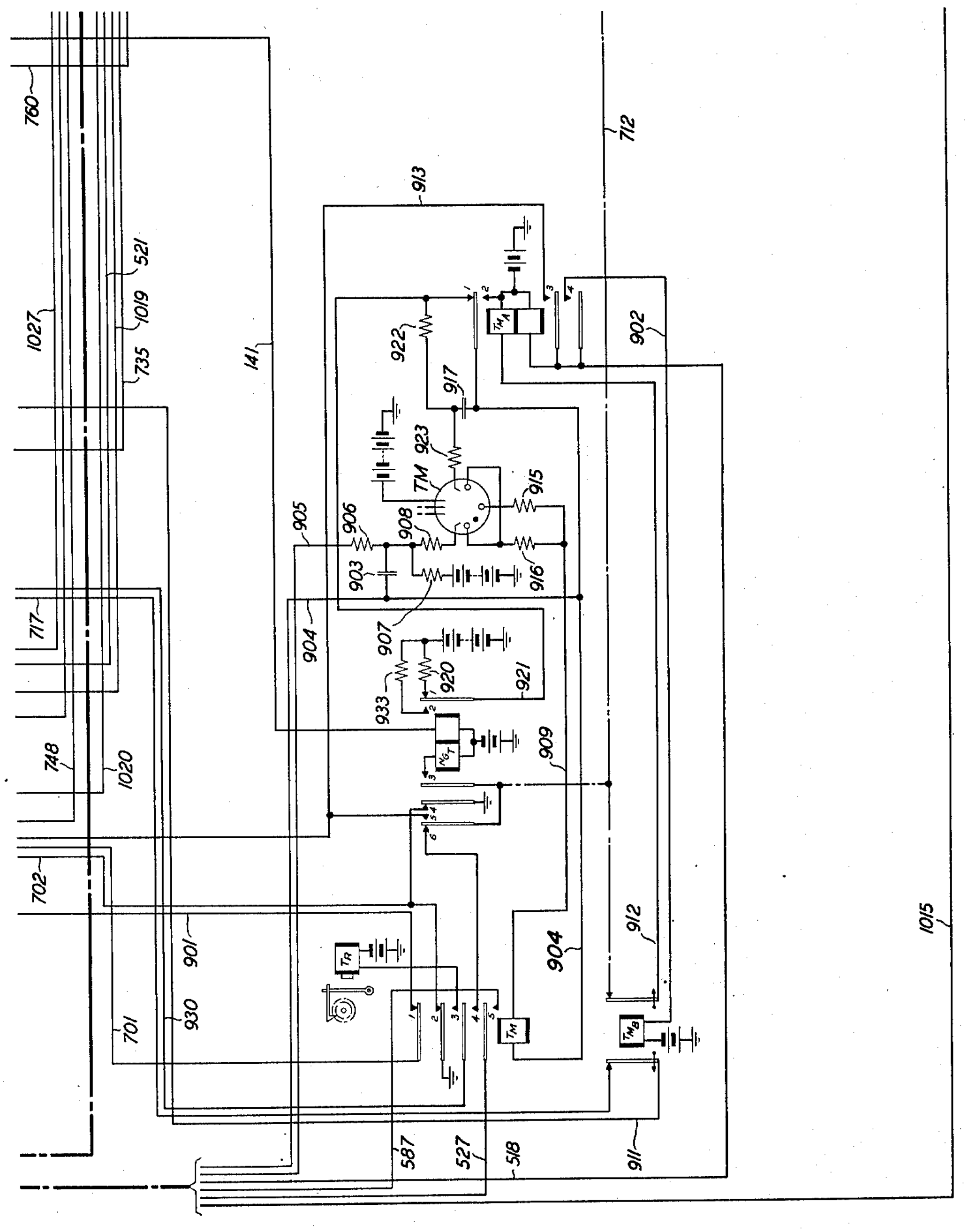
Figure 10:
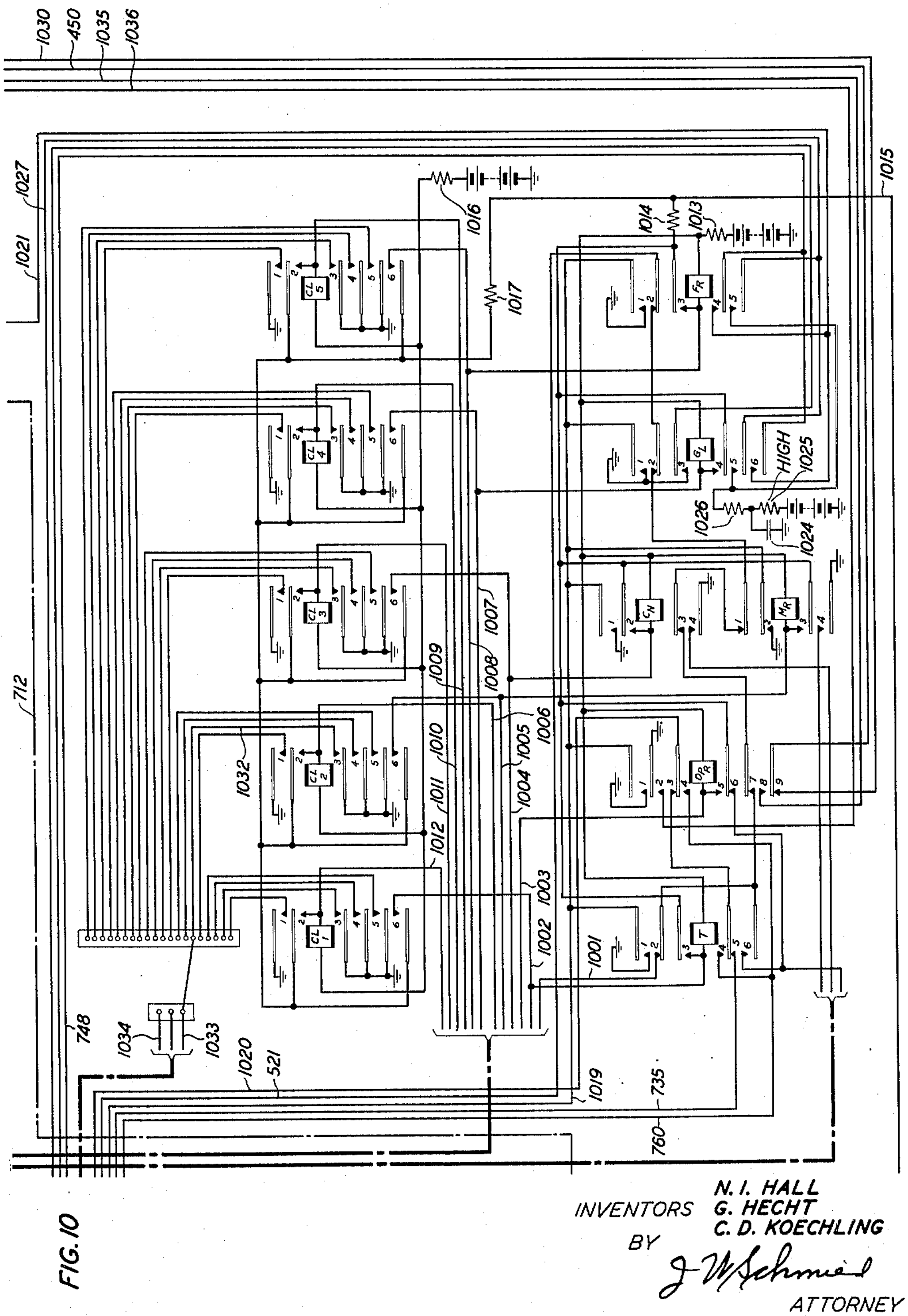

A more complete understanding of the above-mentioned and other features of the invention may be obtained from the following detailed description of the functioning of an illustrative embodiment thereof, when read with reference to the accompanying drawings, in which:

Figs. 1 and 2 are representations of other elements of a system with which the subject register may be associated;

Fig. 3 discloses a progress chain operable successively to associate a certain portion of the register circuit with certain other portions of the register circuit;

Fig. 4 discloses the counting chain by means of which incoming pulses are counted, and certain additional equipment;

Figs. 5, 7 and 8 disclose certain control apparatus comprising a part of the register;

Fig. 6 discloses the storing means for the hundreds, tens and units digits and certain additional equipment;

Fig. 9 discloses time-out means for the register;

Fig. 10 discloses certain class-of-service control relays in the register; and

Fig. 11 shows the manner of arranging the several figures of the drawing.

Throughout the specification the circuit elements will be identified by functional designations followed by a number in parenthesis representing the figure of the drawing upon which that element appears. For example, the off-normal relay in Fig. 5 of the drawing will hereinafter be designated "relay ON(5)."

The eight-element electron discharge devices utilized in the disclosed preferred embodiment of the invention are cold-cathode gas-filled tubes preferably of the type more fully disclosed in Patent 2,549,064 granted April 17, 1951, to W. A. Depp. As shown for example in Fig. 5, tube RA(5) comprises two control anodes 501 and 502, two control cathodes 503 and 504, a main cathode 505, and three main anode 506, 507 and 508. In general, the application of a suitable potential difference between either the control anode 501 and control cathode 503 or between the control anode 502 and control cathode 504 will cause a discharge to occur across the control gap therebetween. With a suitable voltage applied to any one of the main anodes 506, 507 or 508, the control gap discharge will be transferred so as to exist between the control cathode 503 or 504 and the main anode 506, 507 or 508. If the main cathode 505 is at a voltage sufficiently negative in respect to the control cathode 503 or 504, the discharge will then transfer to the main gap so as to exist between the main cathode 505 and the main anode 506, 507 or 508. This sequence will hereinafter be referred to as a control gap discharge followed by first and second transfers of discharge.

Since rapidity of operation is an object in any telephone system, it may here be noted that provision is made to decrease the ionization time of certain of the critical gaseous discharge tubes employed in the system herein disclosed. For example, the circuit of tube RA(5) is arranged so that a minute "keep-alive" circuit flows across the right-hand control gap thereof while that tube is in its non-conducting state. Prior to the time that a suitable positive potential is applied to the left-hand control anode 501 as will be described hereinafter, a suitable main anode potential, such as positive 135 volts, is applied to the left-hand main anode 506 over a path hereinafter to be traced. This potential is also applied to the right-hand control anode 502 of the tube. The right-hand control cathode 504 of tube RA(5) is connected to negative battery, which may supply a negative 48-volt potential, through resistor 509 and through the winding of relay RA(5). Resistor 509 should have a high value of resistance as indicated in the drawing. In the disclosed embodiment, with the potentials applied, and with the characteristics of the particular tube utilized, resistor 509 has been found to best serve its function if its resistance is approximately 22 megohms. With these applied potentials and with high resistance resistor 509 in the external circuit, a current of a few microamperes flows across the right-hand control gap of tube RA(5), i. e., between control anode 502 and control cathode 504. This current is maintained at a value below the threshold current of the tube, but is such that upon the application of a suitable potential difference across the left-hand control gap of the tube, breakdown will occur considerably more rapidly than would otherwise be the case. This "keep-alive" current is interrupted when the main anode voltage is removed, as will be described hereinafter.

Referring now to Figs. 1 and 2 of the drawing, a representation is presented of an exemplary telephone switching system with which the subject system may be associated. A suitable representative system is disclosed and described in detail in Patent 2,666,096, granted January 12, 1954, to W. A. Cornell, N. I. Hall, G. Hecht, C. D. Koechling, F. A. Korn, and H. E. Powell, and the disclosure of that patent is hereby made a part of this specification by reference. The subject-matter of this application is also disclosed and described in the above-cited application W. A. Cornell et al. patent.

*Seizing the junctor and register*

In general, in the representative telephone system of Figs. 1 and 2, the lines from the subscribers' stations appear in the system at the line and line-link circuit (Fig. 1). When a calling subscriber desires to initiate a call, he will lift the receiver or remove the handset from its cradle. The line and line-link circuit is operative in response to that closure of the subscriber's loop to extend the calling party's line to one of a plurality of junctors, one of which is represented partially in detail in Fig. 1. The calling subscriber's tip, ring and sleeve conductors appear at the left of the junctor as conductors 101, 102 and 103, respectively. The tip conductor 101 is extended through the No. 1 contact of unoperated relay CO(1) and to ground through the upper winding of supervisory relay S(1). The ring conductor 102 is extended through the No. 6 contact of relay CO(1) and to battery through the lower winding of relay S(1).

The line and line-link circuit then signals the common release and time-out circuit (Fig. 1) which transmits a signal over conductor 104 which is cabled to Fig. 7, No. 6 contact of unoperated register off-normal relay ON1(7), conductor 701, No. 1 contact of unoperated relay TM(9), conductor 901, through the closed contacts of switch 702 and to conductor 703 which is extended to the register connector of Fig. 2. In a similar manner, the common release and time-out circuit transmits a signal over a similar path in all other of the provided register (not shown) which are idle, and to the register connector. The register connector will then select one of the idle registers for use on this call, herein assumed to be the register shown in the drawing.

The line and line-link circuit then grounds the calling subscriber's sleeve lead, which appears at the junctor (Fig. 1) as conductor 103. This ground on conductor 103 is connected to battery through the winding of the junctor off-normal relay ON(1) whereby that relay is operated to indicate that this junctor is busy. The ground on conductor 103 is also extended through the No. 7 contact of unoperated relay TK(1), conductor 105, No. 3 contact of unoperated relay SR(1) in the junctor, and to conductor 106 which is extended to the register connector of Fig. 2. This ground there serves to operate the register connector to interconnect the selected junctor and the selected register in the manner fully disclosed in the above-cited Patent of W. A. Cornell et al.

This interconnection completes an operating path for the register start relay ST(5), which path may be traced from battery, upper winding of unoperated relay CO(1) in the junctor (Fig. 1), conductor 107 which is extended through the operated register connector (Fig. 2) and to Fig. 5, winding of relay ST(5), resistor 511, conductor 512, No. 5 contact of unoperated relay ON1(7), conductor 702 and to ground through either the No. 2 contact of relay TM(9) or the No. 4 contact of relay NGT(9). The resistance in this circuit is such that insufficient current flows to operate relay CO(1) in the junctor, but relay ST(5) is operated.

Relay ST(5), in operating, connects, at its No. 2 contact, ground to conductor 513, resistor 514, through the biasing winding of pulsing relay L(5) and to battery, to ensure that relay L(5) is unoperated before being closed to the line, as will be described hereinafter. Relay ST(5), in operating, also closes ground through its No. 4 contact to conductor 515 to operate a traffic register (not shown) in the line and line-link circuit (Fig. 1). The operation of this traffic register indicates that this equipment has been employed in originating a call. Relay ST(5), in operating, also closes ground through its No. 1 contact to conductor 516, winding of relay ST1(5), and to battery. Relay ST1(5) operates and locks through its No. 4 contact, conductor 517, to ground through the No. 2 contact of relay SR(5).

Relay ST1(5), in operating, closes ground through its No. 6 contact to conductor 518 which is cabled to Fig. 9, lower winding of relay TMA(9), and to battery. The operation of relay TMA(9) closes the ground on conductor 518 through its No. 4 contact to conductor 902 to operate relay TMB(9). Since the operation of relay ST1(5) interrupts, at its No. 5 contact, the resistance shunt around capacitor 903 comprising conductors 904 and 905 and resistor 906, the operation of relay TMA(9) will close a charging path for capacitor 903 which may be traced from positive battery, resistor 907, across capacitor 903, conductor 904, No. 2 contact of relay TMA(9), and to negative battery. The rising potential on capacitor 903 is applied through resistor 908 to the left-hand control anode of timing tube TM(9). The control cathodes of this tube are connected through resistor 916 and the main cathode thereof is connected through resistor 915 to conductor 909. Conductor 909 is extended through the winding of relay TM(9), conductor 904, No. 2 contact of relay TMA(9), and to negative battery. Therefore, at the lapse of a measured interval a discharge will occur across the left-hand control gap of tube TM(9) unless prior to that time relay ST1(5) has released to release relays TMA(9) and TMB(9) and to reestablish the resistance shunting path around capacitor 903. A time-out is thereby obtained whereby if the circuit functions by means of which relay ST1(5) is released do not immediately occur, the circuit will be released as will be described in detail hereinafter.

Relay ST1(5), in operating, also closes ground through its No. 3 contact, conductor 520, winding of relay ON(5) and to battery. Relay ON(5), in operating, completes a circuit from ground, No. 4 contact of relay ON(5), conductor 521 which extends to Fig. 10, through the No. 2 contact of relay FR(10), No. 2 contact of relay GL(10), No. 1 contact of relay MR(10), No. 3 contact of relay CN(10), No. 7 contact of relay OPR(10), No. 2 contact of relay T(10), and to conductor 1001 which is cabled to the line and line-link circuit of Fig. 1. This ground on conductor 1001 causes the line and line-link circuit to transmit an indication back to the register as to the class of service to which the calling party has subscribed. This service may be non-restricted or restricted, i. e., the subscriber may or may not be permitted to call certain areas without additional charge. A plurality of methods of charging are also available, e. g., the subscriber may pay a flat rate for telephone service over a period of time or may pay on a message-rate basis. Therefore, the line and line-link circuit will connect, in effect, negative battery to one of the conductors 1002 to 1012 in accordance with the calling subscriber's class of service. If that class of service be flat-rate non-restricted, negative battery will be connected by the line and line-link circuit to conductor 1008, winding of class-of-service relay FR(10), resistor 1013, and to positive battery whereby relay FR(10) will be operated. Relay FR(10) locks operated through its No. 3 contact, resistor 1014, conductor 1015 which is extended to Fig. 5, and to ground through the No. 8 contact of operated relay ON(5).

If the class of service be flat-rate restricted, negative battery will be connected to the line and line-link circuit to conductor 1009, winding of relay CL5(10), resistor 1016, and to positive battery. Relay CL5(10), in operating, completes a circuit from positive battery, resistor 1013, winding of relay FR(10), No. 6 contact of relay CL5(10), resistor 1017 and to conductor 1015 which is connected to ground through the No. 8 contact of relay ON(5) as above described. It may be noted that relay CL5(10) locks operated through its No. 2 contact and resistor 1017 to grounded conductor 1015, and relay FR(10) locks over the previously traced path.

Similarly, the trunk class-of-service relay T(10), the operator relay OPR(10), the coin relay CN(10), the message-rate relay MR(10) and the grounded line class-of-service relay GL(10) will be operated if the line and line-link circuit transmits the signal over conductors 1002, 1003, 1004, 1005 or 1007, respectively. Restricted service may also be provided on all but operators' calls, with the application of the signal to conductor 1006 operating relays CL2(10) and MR(10), to conductor 1010 operating relays CL4(10) and GL(10), to conductor 1011 operating relays CL3(10) and CN(10), and to conductor 1012 operating relays CL1(10) and T(10). The functioning of the restricted service relays CL-(10) will be described hereafter.

Relay ON(5), in operating, also causes a shunt to be placed around the winding of relay ST(5), this shunt comprising conductor 107 at the left of the winding of relay ST(5), No. 7 contact of relay ON(5), conductor 522, No. 4 contact of relay CK(7), conductor 702, No. 5 contact of relay ON1(7), conductor 512, and to resistor 511 which is connected to the winding of relay ST(5) completing the shunt. It may be noted that this shunt may be traced over an additional path in that conductor 522 also extends to the No. 1 contact of relay PS(7), and from there the shunting path may be traced over conductor 704, No. 8 contact of relay TK0(7), conductor 705, No. 5 contact of relay VAC(8), conductor 801, No. 8 contact of relay BY1(7), and again to conductor 702 which extends as previously traced. The shunting of the winding of relay ST(5) and of resistor 511 reduces the resistance in the previously traced energizing path for relay ST(5), which included the winding of relay CO(1) in the junctor, and relay CO(1) operates.

Relay CO(1), in operating, completes a circuit from ground at the No. 6 contact of relay TK(1), conductor 109, No. 3 contact of relay CO(1), conductor 110 which extends through certain contacts, not shown, winding of relay SR(1), and to battery.

It will be recalled that the register connector was operated under the control of the line and line-link circuit over a path including the No. 3 contact of relay SR(1). Relay SR(1), in operating, causes the register connector to be held operated under the control of the same relays in the register that hold relay CO(1) operated, i. e. it transfers conductor 106, which is connected to the register connector, through the No. 4 contact of relay SR(1) to conductor 112 which is connected through the No. 4 contact of relay CO(1) to conductor 107 which extends to ground in the register as above described. Relay SR(1), in operating, also connects ground through retard coil 113, No. 5 contact of relay SR(1), to conductor 103 which is the sleeve lead, and thereby provides a holding path for relay ON(1) in the junctor and for certain elements in the line and line-link circuit.

Relay CO(1), in operating, transfers the subscriber's tip and ring conductors from relay S(1) in the junctor to the register. The subscriber's tip conductor enters the junctor as conductor 101, and is connected through the No. 2 contact of relay CO(1) to conductor 114, and through the No. 5 contact of relay RF(1) to conductor 115. The subscriber's ring conductor enters the junctor as conductor 102, and is connected through the No. 5 contact of relay CO(1) to conductor 116, and through the No. 9 contact of relay RF(1) to conductor 117. Conductors 115 and 117 are cabled to the ringing connector in Fig. 2 and are connected through the back contacts of the ringing connector hold magnet HOLD(2) to conductors 201 and 202, respectively. These conductors are connected through the register connector (Fig. 1) and then extend to Fig. 5. The extension 201 of the subscriber's tip conductor is connected to ground through winding 523 of the repeat coil, and the extension 202 of the ring conductor is connected through winding 524 of the repeat coil, and through the lower winding of relay L(5) to battery, thereby operating relay L(5).

Relay L(5), in operating, closes an energizing path for relay SR(5) which may be traced from ground at the No. 2 contact of relay ON(5), conductor 525, front contact of relay L(5), conductor 526, No. 3 contact of relay ON(5), conductor 527, resistor 528, winding of relay SR(5) and to battery. It may be noted that the ground on conductor 527 is also extended through the No. 1 contact of relay CK(7), resistor 706, capacitor 707, and to negative battery. Capacitor 706 thereby receives a charge which serves to delay the release of relay SR(5) as will be seen hereinafter.

Relay SR(5), in operating, opens the previously traced locking path for relay ST1(5) through the No. 2 contact of relay SR(5), and therefore when relay ST(5) releases as a result of the described shunting thereof, the energizing circuit for relay ST1(5) will be interrupted and relay ST1(5) will be released. Relay ST1(5), in releasing, will interrupt the previously traced energizing paths for relays TMA(9) and TMB(9) and those relays will release, interrupting the time-out. Relay ST1(5), in releasing, also opens the previously traced energizing path for relay ON(5), but that relay is held operated by the ground through the No. 4 contact of operated relay SR(5). Relay ST1(5), in releasing, also completes a path from ground through its No. 1 contact, conductor 529, No. 5 contact of relay SR(5), conductor 530, winding of relay ON1(7), and to battery. Relay ON1(7) operates and locks through its No. 4 contact and conductor 525 to ground at the No. 2 contact of relay ON(5). Relay ON1(7), in operating, connects the source of dial tone, comprising alternator 709, through capacitor 710, No. 9 contact of relay ON1(7), conductor 711, No. 4 contact of relay AD(5), conductor 532, to ground through winding 533 of the repeat coil. Since the calling subscriber's tip and ring conductors are connected through the windings 523 and 524, respectively, of the repeat coil as before described, this signal is transmitted to the subscriber to indicate that dialing may proceed.

Relay ON1(7), in operating, also closes, through its No. 3 contact, ground to the off-normal ground conductor 712 which extends to various control relays in the register and which is represented by a dot-dash line in the drawing.

Relay ON1(7), in operating, also causes the operation of the common release and time-out circuit in order that certain of the circuits other than the selected register and junctor may be prepared for additional calls. It will be recalled that the line and line-link circuit operated one of the class-of-service relays shown in the lower portion of Fig. 10. Therefore, upon the operation of relay ON1(7) a circuit is completed from ground through the No. 1 contact of relay FR(10) or through the No. 1 contact of relay GL(10) or through the No. 2 contact of relay MR(10) or through the No. 1 contacts of relays CN(10), OPR(10) or T(10) to conductor 1019 which extends to Fig. 7, No. 7 contact of relay ON1(7), conductor 714, No. 2 contact of unoperated relay DC(5), conductor 534 which extends to Fig. 7 and is then cabled to Fig. 1 to the common release and time-out circuit. This circuit responds to perform the above-mentioned function but does not disturb the established path from the calling subscriber's line through the line and line-link circuit, junctor, register connector, and register.

*Dialing*

PULSING

As hereinbefore described, relay L(5) operates on its lower winding over the subscriber's loop. Consequently, this relay will release in response to the dial pulses or momentary openings of the subscriber's loop. The middle winding of the relay L(5) is a biasing winding which opposes the lower or operating winding sufficiently to force the relay to release when the loop is opened. The energizing path for this winding was previously traced. The upper winding of the pulsing relay L(5) functions as an aiding winding, assisting in both the operation and release of the relay. When relay L(5) is operated, capacitor 535 is charged over a path from negative battery, upper winding of relay L(5), capacitor 535, conductor 536, No. 5 contact of relay ON(5), conductor 537, front contact of relay L(5), conductor 525, No. 2 contact of relay ON(5) and to ground. When the subscriber's loop is opened as by an opening of the dial contacts, relay L(5) will release thereby interrupting the charging path for capacitor 535 and permitting that capacitor to discharge through resistor 538 to negative battery. The current flow through the upper winding of relay L(5), as a result of the discharging of capacitor 535, is in a direction to aid the release of relay L(5) and insures the closure of the back contacts under adverse line conditions where the biasing winding alone might be insufficient. When the subscriber's looop is again closed, relay L(5) again operates to complete the charging circuit for capacitor 535 and the current flowing through the upper winding of relay L(5) as a result of the charging of that capacitor aids the operation of the relay thereby ensuring a steady front contact closure.

As previously described, relay L(5), in operating, closes parallel paths for the operation of relay SR(5) and for the charging of capacitor 707. During the momentary release periods of relay L(5), as a result of the momentary opening of the subscriber's loop, the main energizing path for relay SR(5) is interrupted, but the discharging of capacitor 707 through resistor 706, No. 1 contact of relay CK(7), conductor 527, resistor 528, and through the winding of relay SR(5) sufficiently delays the decay of energy in relay SR(5) so that that relay remains operated during these interruptions. On each operation of relay L(5), capacitor 707 again becomes fully charged so that relay SR(5) will remain operated regardless of the number of dial pulse interruptions that occur.

Immediately prior to dialing, while relay L(5) is operated, capacitor 539 becomes charged over a path from ground, winding 540 of the retard coil, capacitor 539, conductor 541, No. 6 contact of relay ON(5), resistor 542, and to negative battery. At the receipt of the first dial pulse, comprising a momentary interruption of the subscriber's loop, relay L(5) will momentarily release, closing its back contacts. Capacitor 539 will therefore be discharged through the back contact of relay L(5), conductor 525, No. 2 contact of relay ON(5), and to ground. The retard coil acts as an autotransformer with the windings 540 and 543 in series aiding. The negative portion of the stepped-up voltage oscillation is suppressed through rectifying element or varistor 544, and the positive portion is applied to conductor 545. The positive pulse on conductor 545 is conducted through the No. 3 contact of relay RA1(5) and through the No. 4 contact of relay DC(5), in parallel, to conductor 546 over which it is employed to fire the counting chain tubes of Fig. 4 as will hereinafter be described. The positive pulse on conductor 546 is also conducted through the No. 5 contact of relay RA(5), resistor 547, No. 2 contact of relay AD(5), conductor 548, resistor 301 and to ground, thereby applying a positive potential to the left-hand control anode of tube P1(3) for a purpose hereinafter to be described.

The pulse on conductor 546 is also applied to the left-hand control anode 501 of tube RA(5). The left-hand control cathode 503 of tube RA(5) is connected to negative battery through resistor 552 and through the winding of relay RA(5), and therefore a discharge will be initiated across the control gap of that tube. The left-hand main anode 506 of tube RA(5) is connected to a source of positive potential through the No. 8 contact of relay SR(5), conductor 549, through the No. 2 contact of relay NT(8) and through the No. 5 contact of relay NT1(8), in parallel, conductor 802, resistor 550, No. 4 contact of relay RA1(5), resistor 551, and to the main anode 506 of tube RA(5). The main cathode 505 of tube RA(5) is connected to negative battery through the winding of relay RA(5). Therefore, upon the initiation of a control gap discharge in tube RA(5), first and second transfers of discharge will occur and relay RA(5) will be operated. Relay RA(5) is operated at the first pulse of each digit to indicate the beginning of each digit.

It will be recalled that prior to the receipt of the first dial pulse, relays L(5), ON(5) and SR(5) were operated and relay RA(5) was unoperated. Under this condition, capacitor 553 is in a discharged condition, its discharging circuit being traced from ground, capacitor 553, resistor 554, conductor 555, No. 6 contact of unoperated relay RA(5), conductor 525, No. 2 contact of relay ON(5), and to ground. At the receipt of the first dial pulse, relay RA(5) is operated, as above described, to interrupt this path, but capacitor 553 continues to be shunted to ground through the back contact of released relay L(5), conductor 525, No. 2 contact of relay ON(5), and to ground. At the termination of the first dial pulse, relay L(5) again operates, removing this shunt, and permitting capacitor 553 to charge over a path from positive battery, resistor 556, No. 6 contact of relay SR(5), conductor 555, resistor 554, capacitor 553, and to ground. This rising positive potential is applied through resistor 557 to the left-hand control anode of tube RA1(5). The left-hand control cathode of tube RA1(5) is connected through resistor 558, and the main cathode thereof is connected directly through conductor 559, winding of relay RA1(5), to negative battery. The left-hand main anode of tube RA1(5) is connected via conductor 560, upper back contact of relay EX(5), and resistor 561 to conductor 802 which is connected to positive battery as before described. Therefore, when capacitor 553 has charged to a sufficient value, tube RA1(5) will discharge and undergo first and second transfers of discharge. The time constant of the network comprising capacitor 553, resistor 554 and resistor 556 is such, however, that capacitor 553 will not be charged to the critical value during any of the intervals between the pulses representing any one digit. Therefore, if another pulse is immediately received in the course of the dialing of a digit greater than "1," relay L(5) will again release to reestablish the discharging path for capacitor 553. If the digit dialed be "1," or, in any event at the termination of the final dial pulse of the series representing any one digit, an appreciably longer delay will occur before the receipt of the next dial pulse. During this interdigital time, capacitor 553 will charge to the critical value, tube RA1(5) will discharge and transfer, and relay RA1(5) will be operated. Relay RA1(5), in operating, interrupts, at its No. 4 contact, the circuit supplying main anode battery to tube RA(5), that tube will be extinguished, and relay RA(5) will be released.

Relay RA1(5), in operating, also closes a circuit from battery, winding of relay EX(5), No. 1 contact of relay RA1(5), No. 7 contact of relay DC(5), to off-normal ground conductor 712 which is grounded through the No. 3 contact of relay ON1(7) as hereinbefore described. It may be noted that capacitor 562 is charged through resistor 563 in parallel with the winding of relay EX(5) over the same path, the discharge of this capacitor upon the interruption of the energizing path for relay EX(5) rendering that relay slow to release.

Relay EX(5), in operating, interrupts, at its upper contact, the circuit for supplying main anode voltage to tube RA1(5), that tube is extinguished, and relay RA1(5) is released. Relay RA1(5), in releasing, interrupts the previously traced energizing path for relay EX(5), and that relay releases. These operations occur during the interdigital time to restore the pulsing circuit and prepare it for the receipt of the next digit. The storing of the received digit and the restoring of the counting chain also occur at this time as will be described hereinafter.

*Registering the digits*

The incoming pulses of each digit are first counted by means of the counting chain shown in Fig. 4, the first three digits are successively stored in the hundreds, tens, and units storing tubes, respectively, of Fig. 6, under the control of the steering circuit of Fig. 3, and the fourth digit, assuming a four-digit subscriber's designation, is retained and stored in the counting chain of Fig. 4. One skilled in the art will be able readily to modify the disclosed and described circuits to provide for subscribers' codes having a greater or fewer number of digits.

The counting chain comprises six tubes, viz., R16(4), R27(4), R38(4), R49(4), R50(4), and RA5(4). The left-hand main anodes and the right-hand control anodes of the counting tubes R16(4) to R50(4), inclusive, are connected by conductor 401 and resistor 402 to conductor 405; and the left-hand main anode and the right-hand control anode of tube RA5(4) are connected by conductor 403 and resistor 404 to conductor 405. Conductor 405 extends to Fig. 5 and is connected through the lower back contact of relay EX(5) to conductor 802 which is supplied with 135-volt positive battery as before described. The left-hand control cathode of tube R16(4) is connected to ground through a resistance-capacitance network comprising resistors 406 and 407 and capacitor 408, and the left-hand control cathodes of the counting tubes R27(4) to R50(4) are connected to ground through similar individual networks. The left-hand control cathode of "add-five" tube RA5(4) is connected to ground through resistor 409. The main cathode of tube R16(4) is connected through the network comprising resistor 410 and capacitor 411 to negative battery, and the main cathodes of the tubes R27(4) to R50(4), inclusive, are connected to negative battery through similar individual resistance-capacitance networks. The main cathode of tube RA5(4) is connected to negative battery through capacitor 415 and, in parallel therewith, resistor 416 and the winding of relay RA5(4). It may be noted that the right-hand control cathode of each of the tubes in the counting chain is connected to its associated main cathode through a high resistor. For example, the right-hand control cathode of tube R16(4) is connected to the main cathode of that tube, and thereby to negative battery, through high resistor 417. Thus, the tubes in this counting chain are provided with "keep-alive" circuits to insure the rapid operation thereof.

Prior to the receipt of the first dial pulse of any digit, the left-hand control anode of tube R16(4) is connected through resistor 418, through the network comprising resistor 419 and capacitor 420, through resistor 421, conductor 422, No. 2 contact of unoperated relay RA(5), and conductor 564 which is connected to point 565 on the voltage divider comprising ground, resistor 566, No. 5 contact of relay DC(5), conductor 567, No. 7 contact of relay SR(5), resistor 568, and positive battery. Therefore there is an approximately 50-volt positive bias on the left-hand control anode of tube R16(4) before any dial pulse interruptions occur for any one digit. This potential is insufficient to create a control gap discharge in the tube. The left-hand control anodes of the tubes R27(4) to R50(4), inclusive, are connected through similar networks and resistances to the main cathodes of the immediately preceding tubes in the series. For example, the left-hand control anode of tube R27(4) is connected through resistor 425, through resistor 426 and capacitor 427 in parallel, and through resistor 428 to the main cathode of tube R16(4). By these connections, the left-hand control anodes of tubes R27(4), R38(4), R49(4) and R50(4) are connected to negative battery. The left-hand control anode of tube RA5(4) is also connected to negative battery through resistor 429, resistor 430 and resistor 431.

As previously described, upon the receipt of the first dial pulse, a high positive pulse is transmitted over conductor 546 to the counting chain tubes. This positive pulse is applied through capacitors 432 to 437 and through the associated networks to the left-hand control anodes of tubes R16(4), R27(4), R38(4), R49(4), R50(4), and RA5(4), respectively. The left-hand control anode of tube R16(4) has been biased positively, as previously described, and the left-hand control anodes of the remaining tubes R27(4) to RA5(4), inclusive, have all been biased negatively. Therefore, upon the receipt of the first dial pulse, a discharge will occur across the left-hand control gap of tube R16(4) only, and first and second transfers will immediately occur whereby conduction will exist between the main anode and the main cathode of tube R16(4). When relay RA(5) operates, also in response to the receipt of the first pulse of the digit, the previously traced path for applying a positive bias to the left-hand control anode of tube R16(4) is interrupted, and this electrode is then connected to the main cathode of tube R50(4) for purposes of recycling as will be described hereinafter.

Conduction across the main gap of tube R16(4) will result in an appreciable rise in potential at the main cathode thereof, as for example, from negative 48 volts to positive 50 volts. This rise in potential is applied through resistor 428, through the network comprising resistor 426 and capacitor 427, and through resistor 425 to the left-hand control anode of the next succeeding counting tube R27(4). This rise in potential is delayed, however, to the extent of the charging time of capacitor 411 to permit the pulse on the control anodes to disappear to obviate the possibility of tube R27(4) being fired falsely. At the receipt of the next dial pulse, a positive pulse will be applied through capacitors 432 to 437 and to the left-hand control anodes of the several counting chain tubes, and since tube R27(4) is the only one thereof having a suitable priming potential applied to its left-hand control anode, that tube will undergo a discharge across its left-hand control gap, and a first and a second transfer will occur whereby conduction will exist across the main gap thereof.

At the instant of conduction in tube R27(4), its main cathode will remain at approximately 48 volts negative due to the presence of capacitor 439, but the potential at the main cathode of tube R16(4) will be at approximately 50 volts positive as previously described. The additional drop across the common main anode resistor 402 as a result of the conduction through tube R27(4) will lower the potential at the main anodes of tubes R16(4) and R27(4) to a point where the potential difference across the main gap of tube R16(4) is insufficient to sustain conduction, and tube R16(4) will be extinguished.

As capacitor 439 becomes charged, a positive priming potential will be applied to the left-hand control anode of tube R38(4) whereby that tube will be fired on the next dial pulse, extinguishing tube R27(4). Similarly, tubes R49(4) and R50(4) are successively rendered conductive, extinguishing the previously conducting tube. With tube R50(4) conducting as a result of five pulses having been received, the rise in main cathode potential thereof will be applied through conductor 440, through the Nos. 1 and 3 contacts of relay RA(5), and to conductors 570 and 422 respectively. This positive potential is applied over conductor 422, through resistor 421, through the network comprising resistor 419 and capacitor 420, and through resistor 418 to the left-hand control anode of tube R16(4). This positive potential is also applied over conductor 570, through resistors 430 and 429 to the left-hand control anode of tube RA5(4). Therefore, on the sixth pulse, both tubes RA5(4) and R16(4) will fire. Conduction in tube R16(4) will cause tube R50(4) to be extinguished, but it may be noted that tube RA5(4) is provided with an individual main anode impedance comprising resistor 404 and will not, therefore, be extinguished as a result of conduction in any of the other counting chain tubes. Subsequent dial pulses will be counted as before, with conduction continuing in tube RA5(4) to indicate that conduction through tube R27(4) now represents the digit "7," that conduction through tube R38(4) now represents the digit "8," and so forth. Since relay RA5(4) is in the main cathode circuit of tube RA5(4), as previously described, conduction across the main gap of that tube will result in the operation of relay RA5(4).

It may be noted that further means are provided to insure the proper extinguishing of a preceding tube upon the firing of the next succeeding tube. As above described, with tube R16(4) conducting and after capacitor 411 has fully charged, the main cathode potential of that tube rises to approximately 50 volts positive, and this positive potential is applied to the left-hand control anode of tube R27(4). At the next pulse on conductor 546, tube R27(4) is fired and tube R16(4) is extinguished. As capacitor 439 becomes charged the main cathode potential of tube R27(4) rises to approximately 50 volts positive. As capacitor 411 discharges through resistor 410, the main cathode potential of tube R16(4) falls again to approximately negative 48 volts. However, with the main anode of tube R27(4) having risen to approximately 125 volts positive, even after tube R27(4) has undergone both transfers of discharge, a discharge will continue to occur between the main anode of tube R27(4), left-hand control anode of tube R27(4), resistor 425, through the network comprising resistor 426 and capacitor 427, resistor 428, and through the network comprising resistor 410 and capacitor 411 to negative battery. Therefore, the left-hand control anode of tube R27(4) will remain at an approximately 50-volt positive potential while tube R27(4) is conducting. At the next pulse on conductor 546, tube R38(4) will be fired, and the main anode potential of all of the counting chain tubes will drop to a low positive value, such as positive 10 volts. Since the main cathode potential of tube R27(4) has risen to approximately 50 volts positive, the main gap discharge in tube R27(4) will cease. Since the left-hand control anode of tube R27(4) is also at a positive 50-volt potential, conduction between that control anode and the main anode will also cease. If the left-hand control anode were connected to negative battery solely through resistors, the potentials thereat would immediately drop to negative 48 volts, and if tube R27(4) had not completely deionized a discharge might then occur between the left-hand control anode and the main anode of tube R27(4). The capacitive elements are provided in the circuit of the left-hand control anode to obviate this possibility by providing a time delay network to hold that control anode positive sufficiently long for tube R27(4) to become completely deionized. These considerations also apply to the other tubes in the counting chain.

It may also be noted that current-controlling means are associated with the left-hand control cathodes of the counting chain tubes. Thus, ground is connected to the left-hand control cathode of tube R16(4) through series resistor 496 and through the parallel combination of resistor 497 and capacitor 498. This network serves to permit a large initial surge of current at the first transfer of discharge in the tube but thereafter serves to limit the conduction between the main anode and left-hand control cathode after the second transfer has occurred thereby serving to cause the conduction in the tube primarily to exist between the main anode and the main cathode thereof.

*Storing and preliminary pulse absorbing*

As each of the digits of the assumed four-digit subscriber's number is received, the pulses representing each digit are counted in the counting chain of Fig. 4 as above described, with relay RA(5) operating at the beginning of each digit, and relay RA1(5) operating at the end of each digit. As the first or hundreds digit is received and counted, it will be stored in the hundreds storing tubes H16(6) to HA5(6), inclusive, and the counting chain is reset in preparation for the counting of the next digit. The second or tens digit is counted by means of the counting chain tubes R16(4) to RA5(4), inclusive, and is then stored in the tens storing tubes T16(6) to TA5(6), inclusive, and the counting chain is reset. The third or units digit is counted, and is then stored in the units storing tubes U16(6) to UA5(6), inclusive. The fourth digit, representing the ringing code, is both counted and stored in the counting chain tubes R16(4) to RA5(4), inclusive. The successive transfer of the counted digits to their respective series of storing tubes is accomplished under the control of the steering tubes P1(3), P2(3) and P3(3) and the associated steering relays P1(3), P2(3) and P3(3).

As previously noted, the positive pulse on conductor 545, resulting from the receipt of the first dial pulse representing the first digit to be transmitted, is conducted through the No. 4 contact of relay DC(5) and through the No. 3 contact of relay RA1(5) in parallel, to conductor 546, through the No. 5 contact of relay RA(5), resistor 547, No. 2 contact of relay AD(5), conductor 548, and through resistor 301 to ground whereby this positive pulse is applied to the left-hand control anode of steering tube P1(3). The left-hand control cathode of tube P1(3) is connected to negative battery through resistors 302 and 303 and the winding of relay P1(3). Therefore, a discharge will be initiated across the left-hand control gap of that tube. Since the left-hand main anode of tube P1(3) is connected through resistor 304 to conductor 802 which is connected to a positive main anode battery supply as previously described, tube P1(3) will undergo a first transfer whereby conduction will exist between the main anode and the left-hand control cathode thereof. Since the main cathode of that tube is connected to negative battery through resistor 303 and the winding of relay P1(3) and also through capacitor 305, a second transfer will occur, conduction will exist across the main gap of the tube, and relay P1(3) will be operated. It may be noted that the right-hand control electrodes of this tube are connected as a "keep-alive" circuit similar to that previously described in order to expedite the discharge in the tube.

The operation of relay P1(3) prepares a circuit whereby upon the operation of relay AD(5) (hereinafter to be described) a suitable negative potential will be applied to the control cathodes of the hundreds storing tubes over a path from negative battery, No. 5 contact of relay RA1(5), which operated at the end of the digit, No. 1 contact of relay AD(5), the operation of which has not as yet been described, conductor 571, upper front contact of operated relay P1(3), conductor 306, and through resistor 601 to ground whereby a negative voltage is applied through resistors 602 to 607 to the left-hand control cathodes of the hundreds storing tubes H16(6), H27(6), H38(6), H49(6), H50(6), and HA5(6), respectively. Until relay AD(5) is operated, however, this path is not complete, and the first or hundreds digit cannot be transferred from the counting chain tubes to the hundreds storing tubes.

Relay AD(5) is provided so that any preliminary pulse, transmitted by an inadvertent fumble of the switchhook, for example, may be absorbed. If, after the first pulse is received and counted by tube R16(4), a sufficient delay ensues so that relay RA1(5) is operated, this pulse will represent that the first digit transmitted is "1." The operation of relay RA1(5) will cause the operation of relay EX(5) as previously described. The operation of relay EX(5) will remove main anode battery from the counting chain tubes and tube R16(4) will be extinguished. Therefore, the circuits are returned to their normal condition as if no pulse had been received. It may be noted that since such a preliminary pulse is thus absorbed, a subscriber's number must have, as its first digit, a number other than "1."

If the first digit received is "2" or greater, tube R27(4) will be or will have been rendered conductive during the counting of the pulses representing that digit. When that tube becomes conducting, the rise in cathode potential thereof is transmitted over conductor 441, through the No. 8 contact of relay AD(5), resistor 572, conductor 573, resistor 610, and to the left-hand control anode of tube AD(6). Negative battery is supplied through the upper winding of relay AD(5), No. 6 contact of relay AD(5), and conductor 574 to the main cathode of tube AD(6), and through resistor 611 to the left-hand control cathode of that tube. The left-hand main anode of tube AD(6) is connected through resistor 612 to conductor 802 over which main anode battery is supplied as before mentioned. Therefore, tube AD(6) will undergo a control gap discharge and first and second transfers, and relay AD(5) will be operated.

Relay AD(5) locks over a path from negative battery, upper winding of relay AD(5), No. 7 contact of that relay, lower winding of that relay, resistor 576 to conductor 802 through which the positive battery at the No. 8 contact of relay SR(5) is supplied as before explained. Relay AD(5) will thereby remain operated under the control of relay SR(5). Relay AD(5), in operating and locking, interrupts the supply of negative voltage to the cathodes of tube AD(6) thereby extinguishing that tube.

With relay AD(5) operated as a result of the receipt of a first or hundreds digit greater than "2," the above-described path for the supplying of negative battery to the left-hand control cathodes of the hundreds storing tubes through the upper contact of relay P1(3) will be completed. It may be noted that since relay AD(5) is locked operated, "1" may be used as the tens, units or ringing code digit. Relay AD(5), in operating, also interrupts, at its No. 4 contact, the circuit over which dial tone was supplied to the calling subscriber.

The main cathodes of the counting chain tubes are connected to the left-hand control anodes of their corresponding hundreds, tens and units storing tubes. Thus, the main cathode of counting chain tube R16(4) is connected by conductor 443 and through resistors 614, 615 and 616 to the left hand control anodes of the hundreds storing tube H16(6), of the tens storing tube T16(6), and of the units storing tube U16(6), respectively. Similarly, the main cathode of counting chain tube R27(4) is connected by conductor 441 through individual resistors to the left-hand control anodes of tubes H27(6), T27(6), and U27(6). The other corresponding tubes are similarly interconnected, including the main cathode of the "add-five" counting chain tube RA5(4) being connected by conductor 444 through individual resistances to the left-hand control anodes of tubes HA5(6), TA5(6) and UA5(6).

The main cathodes of tubes H16(6), H27(6), H38(6), H49(6), and H50(6) are connected to a source of negative voltage through resistors 617 to 621, respectively, and the main cathode of tube HA5(6) is connected to negative battery through the winding of relay HA5(6). Similarly, the main cathodes of the tens storing tubes T16(6) to T50(6), inclusive, are connected to negative battery through individual resistors, and the main cathode of tube TA5(6) is connected to negative battery through the winding of relay TA5(6). And in a similar fashion the main cathodes of the units storing tubes U16(6) to U50(6) are supplied with negative battery, with tube UA5(6) having the winding of relay UA5(6) in its main cathode circuit.

It will be recalled that a positive voltage from the positive battery at the No. 8 contact of relay SR(5) is supplied to conductor 802. This positive, main anode voltage is thereby connected through common resistor 623 to the left-hand main anodes of tubes H16(6), H27(6), H38(6), H49(6), and H50(6), and through individual resistor 624 to the main anode of tube HA5(6). Similarly, main anode voltage is supplied to tubes T16(6) to T50(6), inclusive, through the common resistor 625, and to tube TA5(6) through the individual resistor 626. In a similar fashion, the main anodes of tubes U16(6) to U50(6), inclusive, are connected to positive battery through resistor 627, and the main anode of tube UA5(6) is connected to positive battery through resistor 628.

It may therefore be seen that upon the receipt and counting of dial pulses representing a first or hundreds digit greater than "1," and upon the operation of relay RA1(5) during the interdigital delay period following the transmission of those pulses, discharge initiating and sustaining potentials are applied to the electrodes of the hundreds storing tubes which are associated with conducting counting chain tubes. Letting it be assumed for the present that the called subscriber's numerical designation is "236-2," the first or hundreds digit is "2," and counting chain tube R27(4), only, will be conducting. The rise in main cathode potential of that tube will be transmitted to the left-hand control anode of hundreds storing tube H27(6), and since the left-hand control cathode of that tube is connected to a source of suitable negative voltage through contacts of relays P1(3), AD(5), and RA1(5) as above described, a control gap discharge will be initiated in tube H27(6), and first and second transfers will immediately occur, whereby conduction will exist across the main gap thereof.

This transfer of the counted digit to the storing tubes occurs during the period after relay RA1(5) is operated, and before relay EX(5) operates. When relay EX(5) operates, the previously traced circuit for the supply of main anode voltage to the counting chain tubes R16(4) to RA5(4), inclusive, is interrupted, and the conducting counting chain tubes will be extinguished. Under the assumed conditions, tube R27(4) is the only counting chain tube which is conducting, and it will be extinguished. Since relay EX(5), in operating, causes the release of relay RA1(5) which, in turn, interrupts the energizing path for relay EX(5), the counting chain tubes must be extinguished before relay EX(5) again releases to reestablish the main anode supply. The charge on capacitor 562 insures that relay EX(5) will be sufficiently slow to release for the counting chain tubes to become deionized to the required degree.

As previously mentioned, the release of relay RA1(5) releases relay RA(5) which results in the discharge of capacitor 553 at the control anode of tube RA1(5), and the circuit is prepared for the receipt of the second or tens digit.

At the first dial pulse of the second or tens digit, a positive pulse is transmitted from the retard coil over conductor 545, through the No. 3 contact of relay RA1(5) and through the No. 4 contact of relay DC(5) in parallel, conductor 546, No. 5 contact of relay RA(5), resistor 547, No. 3 contact of operated relay AD(5), conductor 577, lower front contact of operated relay P1(3), conductor 307, and through resistor 308 to ground, whereby this positive pulse is applied to the right-hand control anode of tube P2(3). Negative battery is supplied through the winding of relay P2(3), conductor 309 and resistor 310 to the main cathode, and through the additional resistor 311 to the right-hand control cathode of tube P2(3). It may be noted that negative battery is also connected through capacitor 312 to the cathodes of this tube. The main anode of tube P2(3) is connected to main anode battery through resistor 304 which is common to tubes P1(3), P2(3), P3(3), and DC(5). When the positive pulse is applied to the right-hand control anode of tube P2(3), a control gap discharge and first and second transfers will immediately occur. The main cathode of tube P2(3) will be momentarily held at approximately negative battery potential by capacitor 312, while the main cathode of previously conducting tube P1(3) will be at a considerably higher voltage since capacitor 305 will have become fully charged. Therefore, in a manner similar to that in which the counting chain tubes operate and commutate, the additional drop across resistor 304 resulting from the conduction through tube P2(3) will drop the potential at the main anodes to a point where the potential difference between the main anode and main cathode of tube P1(3) is below sustaining voltage, and that tube will be extinguished. As tube P2(3) continues to conduct, capacitor 312 charges whereby the main cathode potential of tube P2(3) rises so that tube P2(3) may be extinguished upon the subsequent rendering of tube P3(3) conductive, and relay P2(3) is operated. The extinguishing of tube P1(3) will release relay P1(3), which will interrupt the circuit over which negative battery had previously been supplied to the control cathodes of the hundreds storing tubes H16(6) to HA5(6), inclusive.

The first dial pulse of the second digit also operates relay RA(5) as before and fires the counting chain tube R16(4). Since "3" is the tens digit of the assumed called subscriber's number, two additional dial pulses will be received which will result in counting chain tube R38(4), only, being conductive. During the interdigital delay, capacitor 553 will charge, and tube RA1(5) will be rendered conductive, operating relay RA1(5) as previously described. Relay RA1(5), in operating, will complete a circuit from negative battery through the No. 5 contact of relay RA1(5), No. 1 contact of locked operated relay AD(5), conductor 571, No. 6 contact of operated relay P2(3), conductor 315, and through resistor 629 to ground, whereby a negative potential is applied to the left-hand control cathodes of the tens storing tubes T16(6) to TA5(6), inclusive. Since counting chain tube R38(4) is conducting, a positive voltage will be applied over conductor 445 and through resistor 630 to the left-hand control anode of tube T38(6). Tube T38(6) will therefore be rendered conductive to store the digit "3" as the tens digit of the called subscriber's number. Relay EX(5) will be operated and released, relays RA1(5) and RA(5) will be released, and the counting chain tubes will be extinguished in preparation for the receipt of the next digit.

At the first dial pulse of the third or units digit, a positive pulse is again transmitted to conductor 577 from which that pulse is passed through the lower back contact of released relay P1(3), conductor 316, No. 7 contact of operated relay P2(3), conductor 317, and through resistor 318 to ground whereby the pulse is applied to the right-hand control anode of tube P3(3). This tube fires, transfers, extinguishes tube P2(3) thereby releasing relay P2(3), and operates relay P3(3) in its main cathode circuit in a manner similar to that previously described in relation to the firing of tube P2(3) at the beginning of the second digit. The release of relay P2(3) interrupts the circuit over which negative battery had previously been applied to the control cathodes of the tens storing tubes T16(6) to TA5(6), inclusive. The operation of relay P3(3) prepares a circuit whereby upon the operation of relay RA1(5) at the end of the third digit negative battery will be connected through the lower front contact of operated relay P3(3), conductor 319, and through resistor 632 to ground whereby the negative potential will be applied through individual resistors to the left-hand control cathodes of the units storing tubes U16(6), U27(6), U38(6), U49(6), U50(6) and UA5(6).

Since the units digit of the assumed called subscriber's number 236–2 is "6," six dial pulses will be received and counted by means of the counting chain. The sixth pulse will render both tubes RA5(4) and R16(4) conductive as hereinbefore described. Full conduction in tube RA5(4) will cause the operation of relay RA5(4) which is in the main cathode circuit of that tube. The rise in main cathode potential of tube R16(4) will be transmitted over conductor 443 and through resistor 616 to the left-hand control anode of tube U16(6). The rise in main cathode potential of tube RA5(4) will be transmitted over conductor 444 and through resistor 633 to the left-hand control anode of tube UA5(6). Therefore, upon the elapse of the requisite portion of the interdigital time and the resultant operation of relay RA1(5), tubes U16(6) and UA5(6) will be rendered conductive to store the digit "6." Relay EX(5) will operate and release, the counting chain tubes will be extinguished, and tubes and relays RA1(5) and RA(5) will be released in preparation for the receipt of the next digit.

Upon the receipt of the first dial pulse of the fourth or ringing code digit, a positive pulse is transmitted over conductor 577, through the lower back contact of released relay P1(3), conductor 316, No. 8 contact of released relay P2(3), conductor 325, upper front contact of operated relay P3(3), conductor 326, and through resistor 578 to ground, whereby the positive pulse is applied to the right-hand control anode of tube DC(5). Since negative battery is connected through the winding of relay DC(5), conductor 573, through resistor 539 to the main cathode of tube DC(5) and through resistor 531 to the right-hand control cathode of that tube, as well as through capacitor 532 to these cathodes, a discharge will occur across the right-hand control gap of tube DC(5), first and second transfers will occur, tube P3(3) will be extinguished due to the additional drop across resistor 364, relay P3(3) will be released, and relay DC(5) will be operated. The release of relay P3(3) will interrupt the circuit over which negative battery had previously been supplied to the control cathodes of the units storing tubes U16(6) to UA5(6), inclusive.

Since the fourth or ringing code digit of the assumed subscriber's number 236–2 is "2," counting chain tube R27(4) will be rendered conductive, and will remain conductive to store this ringing code digit. At the pause following the last dial pulse of this digit, tube RA1(5) will fire and relay RA1(5) will be operated. The operation of relay RA1(5) will cause the extinction of conduction through tube RA(5) and relay RA(5) will be released. Relay EX(5), however, will not operate since its previously traced energizing path is interrupted at the No. 7 contact of relay DC(5) as a result of the operation of relay DC(5). Since relay EX(5) does not operate, the main anode circuits for tube RA1(5) and for the counting chain tubes will not be interrupted. Therefore, tube R27(4) will remain conducting to store the ringing code digit "2" and relay RA1(5) will not be released. It may be noted that any further dialing will be ineffective in that the pulse output circuit from the retard coil comprising windings 540 and 543 is interrupted by the opening of the No. 3 contact of relay RA1(5) and by the opening of the No. 4 contact of relay DC(5).

The conjoint operation of relays RA1(5) and DC(5) closes an energizing circuit for relay DC1(7) which may be traced from negative battery, winding of relay DC1(7), conductor 717, left-hand back contact of relay TMB(9), conductor 911, No. 5 contact of relay CK(7), conductor 718, No. 3 contact of operated relay DC(5), conductor 583, No. 2 contact of operated relay RA1(5) to off-normal ground conductor 712 which is grounded through the No. 3 contact of relay ON1(7). Relay DC1(7) will therefore be operated to perform functions hereinafter to be described.

As hereinbefore mentioned, provision is made for time-out in the event that relay ST1(5) fails to release within a prescribed time. Provision is also made for the circuits to time-out if the subscriber fails to start dialing within another, and preferably considerably longer, prescribed time, or if a series of digits none of which is greater than "1" are received, or if an extended delay period occurs during the dialing.

If, at the time relay ON1(7) operates at the seizure of the register, relay ST1(5) has released to release relay TMA(9) which, in turn, has released relay TMB(9), the operation of relay ON1(7) will close an operating circuit for relay TMA(9) which may be traced from ground through the No. 3 contact of relay ON1(7), off-normal ground conductor 712, through the right-hand back contact of relay TMB(9), conductor 912, upper winding of relay TMA(9), and to negative battery. Relay TMA(9), in operating, will lock operated over a path from negative battery, lower winding and No. 3 contact of relay TMA(9), conductor 913, No. 8 contact of relay ON1(7), conductor 720, No. 5 contact of unoperated relay AD(5) to off-normal ground conductor 712. This ground is also extended through the Nos. 3 and 4 contacts of operated relay TMA(9) to conductor 902, through the winding of relay TMB(9) and to negative battery. Relay TMB(9) operates to interrupt the original operating path for relay TMA(9). Relay TMA(9), in operating, connects negative battery through its No. 2 contact to conductor 904, through the winding of relay TM(9), conductor 909, and through resistors 915 and 916 to the main and control cathodes, respectively, of tube TM(9). This negative battery on conductor 904 is also applied to the lower electrode of capacitor 917. Positive battery is connected through resistor 920, No. 1 contact of relay NGT(9), conductor 921, resistor 922 to the upper electrode of capacitor 917. This capacitor will begin to charge, with the rising potential thereon being applied through resistor 923 to the right-hand control anode of tube TM(9). As indicated, the time constant of the network including capacitor 917 is preferably considerably greater than the time constant of the network including capacitor 903. If relay TMA(9) is not released within this time, a discharge will be initiated across the right-hand control gap of tube TM(9). It may be noted that if, upon seizure of the register, relay ON1(7) is operated prior to the time that relay TMA(9) is completely released as a result of the release of relay ST1(5), relay TMA(9) will immediately lock over the above-traced locking circuit.

If dialing commences before capacitor 917 has charged to the critical potential, relay AD(5) will be operated at the second dial pulse of the first digit, but the locking path for relay TMA(9) will be maintained during the dialing of that digit since conductor 720 is then connected to off-normal ground conductor 712 through the No. 4 contact of relay RA(5) which is operated at the beginning of each digit. At the end of the first digit, relay RA(5) releases thereby releasing relay TMA(9). The release of relay TMA(9) interrupts the energizing circuit for relay TMB(9). The release of relay TMB(9) again closes the energizing circuit for relay TMA(9) to off-normal ground conductor 712, but relay TMB(9) is slow to release so that capacitor 917 may completely discharge through the circuit including resistor 922 and the No. 1 contact of relay TMA(9) prior to the reoperation of relay TMA(9). At the beginning of the second digit, relay RA(5) operates to provide a locking path for relay TMA(9) and an operating path for relay TMB(9); and at the end of that digit relay RA(5) releases to release relay TMA(9) which releases relay TMB(9), which, in turn, reoperates relay TMA(9). This cycle repeats as each digit is received. At the completion of the last digit, relay TMA(9) is released at the release of relay RA(5). Relay TMA(9) releases relay TMB(9) which again closes the circuit for the operation of relay TMA(9) to restart timing. The operation of the circuit in the event that time-out occurs will be discussed hereinafter.

*Idle-busy-vacant test*

When relay DC1(7) is operated, a circuit is closed from ground, No. 3 contact of relay RS(7), conductor 722, No. 2 contact of relay DC1(7) and to conductor 723 which is extended to the common release and time-out circuit in Fig. 1. Relay DC1(7), in operating, also completes a circuit from ground through the No. 2 contact of relay RS(7), conductor 724, No. 1 contact of relay DC1(7), and to conductor 725 which is also extended to the common release and time-out circuit of Fig. 1. Relay DC1(7), in operating, also completes a loop from conductor 119 at the common release and time-out circuit, No. 4 contact of relay DC1(7), conductor 726, No. 4 contact of relay RS(7), and conductor 727 which is extended back to the common release and time-out circuit of Fig. 1. The common release and time-out circuit responds to this conditioning to lock out originating calls and terminating calls from other registers, and relay LO(1) therein operates. The common release and time-out circuit then operates the number-ground connector relay NGC(2) to associate the register with the number-group circuit (Fig. 2) and to perform certain additional functions hereinafter to be described. The operation of the common release and time-out circuit is fully described in the above-cited patent of W. A. Cornell et al.

Relay NGC(2), in operating, connects the windings of the tens translator relays T16(2), T27(2), T38(2), T49(2), and T50(2) in the number-group connector through the Nos. 36 to 32 contacts, respectively, of relay NGC(2), to the main cathodes of the tens storing tubes T16(6), T27(6), T38(6), T49(6), and T50(6), respectively. With the assumed tends digit "3" stored in the tens storing tubes, and with, therefore, tube T38(6) conducting as previously described, the main cathode of tube T38(6) is at or above ground potential. This potential is connected through conductor 635, No. 34 contact of relay NGC(2), conductor 203, winding of tens translator relay T38(2) and to negative battery. Relay T38(2) will therefore be operated. In a similar fashion, whichever of the tens storing tubes is conducting as a result of the registration of a tens digit, upon the operation of relay NGC(2), the correspondingly designated one of the tens translator relay T16(2) to T50(2) will be operated. In a similar manner, relay NGC(2), in operating, will connect the windings of the units translator relays U16(2), U27(2), U38(2), U49(2), and U50(2) through the Nos. 43 to 39 contacts, respectively, of relay NGC(2) to the main cathodes of the units storing tubes U16(6), U27(6), U38(6), U49(6) and U50(6), respectively. Thus, with the assumed units digit "6" stored in the units storing tubes, tubes U16(6) and UA5(6) will be conducting. The ground potential, or the potential positive relative to ground, at the main cathode of tube U16(6), will be transmitted over conductor 636, No. 43 contact of relay NGC(2), conductor 204, winding of relay U16(2), and to negative battery. Relay U16(2) will thereby be operated. Conduction in tube UA5(6) will result in the operation of relay UA5(6) as above described.

Relay NGC(2), in operating, also connects ground through its No. 4 contact, conductor 205, No. 4 contact of relay ID(8), conductor 808, No. 2 contact of relay VAC(8), conductor 809, winding of relay HST(8) and to negative battery. Relay HST(8), in operating, connects positive battery through resistor 812, winding of relay IB(8), conductor 813, resistor 814, middle front contact of relay HST(8) and to conductor 815. Since the digit "6" has been assumed to have been stored in the units storing tubes and since, therefore, relay UA5(6) is operated, this positive voltage on conductor 815 will be connected through the front contact of relay UA5(6), conductor 638, No. 37 contact of relay NGC(2), conductor 206 and to the outer front contacts of the units translator relays U16(2) to U50(2), inclusive. Since relay U16(2) is operated as above described, this positive voltage will be passed through the outer front contact of that relay to the "6" conductor 207. It may be noted that had a digit less than "6" been registered in the units storing tubes, relay UA5(6) would have been released, and the positive potential would have been extended through the back contact of relay UA5(6), conductor 639, No. 38 contact of relay NGC(2), conductor 208, and to the inner upper front contacts of the units translator relays. The positive potential on the "6" conductor 207 is conducted to the number-group circuit (Fig. 2) for a purpose hereinafter to be explained.

Referring again to Fig. 8, negative battery is connected through the winding of relay BY(8), conductor 816, resistor 640, and to the armature of relay TA5(6). Since the digit "3" is stored in the tens storing tubes, relay TA5(6) is not operated, and, therefore, this negative votlage is conducted through the back contact of relay TA5(6), conductor 641, No. 31 contact of relay NGC(2), and through conductor 209 to the inner front contacts of the tens translator relays. Since relay T38(2) is operated as above described, the negative voltage will be conducted through the inner upper front contact of that relay to the "3" tens conductor 210 which is extended to the number-group circuit of Fig. 2.

Relay HST(8), in operating, connects ground through its No. 1 contact to conductor 818, capacitor 819, winding of relay HP(8), outer upper back contact of relay HP(8) and to negative battery. Relay HP(8) will thereby operate in the charging path of capacitor 819. Relay HP(8), in operating, connects negative battery through its outer upper front contact to conductor 816 thereby short-circuiting the winding of relay BY(8) and applying full negative battery over the previously-traced path to the number-group circuit (Fig. 2). Relay HP(8), in operating, also connects positive battery through its inner upper front contact to conductor 813 thereby short-circuiting the winding of relay IB(8) and applying full positive battery over the previously-traced path to the number-group circuit.

It will be recalled that the one of the hundreds storing tubes which is conducting, assumed to be tube H27(6), has conduction therethrough limited by resistor 623 in the main anode circuit thereof. Relay HP(8), in operating, connects full positive battery through its inner upper front contact and through conductor 820 to the main anodes of the hundreds counting tubes, and, thus, full positive battery is applied to the main anode of tube H27(6). The increased conduction through hundreds storing tube H27(6) as a result of this increased potential at the main anode thereof causes the voltage at the main cathode thereof to rise to approximately 50 volts positive. This rise in potential is applied over conductor 642, inner upper back contact of unoperated relay HA5(6), conductor 643 which is cabled to Fig. 2, No. 23 contact of relay NGC(2), conductor 211, through resistor 212 to ground and through conductor 211 to the number-group circuit. It may be noted that had hundreds storing tube HA5(6) been operated as well as tube H27(6), relay HA5(6) would have been operated and the rise in cathode potential of tube H27(6) would have been applied through conductor 642, through the inner upper front contact of relay HA5(6), conductor 644, No. 24 contact of relay NGC(2) and to conductor 216 which is extended to the number-group circuit.

In response to the application of these potentials to the selected ones of these conductors, the number-group circuit cooperates with the line and line-link circuit to select the called subscriber's line in a manner fully disclosed in the above-cited patent of W. A. Cornell et al.

It may be noted that relay HP(8), in operating, also interrupts, at its outer upper back contact, its own energizing circuit, and therefore, after a short interval, releases. The positive potential applied from the hundreds storing tubes to the number-group circuit will therefore be a square top pulse of short duration. It may also be noted that relay HP(8), in releasing, restores the previously-traced energized path for itself. Relay HP(8) will not reoperate, however, since capacitor 819 has become fully charged during the operating time of relay HP(8) over a path from ground, No. 1 contact of relay HST(8), conductor 818, capacitor 819, resistor 821, outer upper front contact of relay HP(8) and to negative battery. It may be noted that when relay HST(8) releases as will be described hereinafter, capacitor 819 will be discharged. Relay HP(8), in releasing, removes the short circuits from relays IB(8) and BY(8).

While relay HST(8) is operated, a circuit is completed from ground on off-normal ground conductor 712, No. 7 contact of relay RT(8), conductor 822, No. 2 contact of unoperated relay IB(8), conductor 823, inner front contact of relay HST(8), conductor 824, winding of "vacant line" relay VAC(8), and to negative battery. Relay VAC(8) is thereby energized but is slow to operate. If the called line is not vacant, relay IB(8) will be operated as will be described immediately hereinafter. The operation of relay IB(8) in that event will interrupt the above-traced energizing path for relay VAC(8) and relay VAC(8) will not operate. If the line is vacant, relay IB(8) will not be operated and relay VAC(8) will be allowed to operate to indicate that the line is vacant.

If the called line is idle, conditions are established in the line and line-link circuit (Fig. 1) whereby sufficient current flows through the winding of relay IB(8) to operate that relay. If the called line is busy, conditions are established in the line and line-link circuit whereby sufficient current flows through the windings of relays IB(8) and BY(8) to operate both of those relays. The functioning of the system when the called line is busy will be discussed hereinafter, it being assumed for the present that the called line is idle.

Relay IB(8), in operating, closes a path from ground on off-normal ground conductor 712, No. 7 contact of relay RT(8), conductor 822, No. 1 contact of relay IB(8), conductor 825, No. 1 contact of unoperated relay BY(8), conductor 826, winding of "idle" relay ID(8) and to negative battery. Relay ID(8) is thereby operated and locks over a path from negative battery, winding of relay ID(8), conductor 826, No. 1 contact of relay VAC(8), conductor 827, No. 1 contact of relay ID(8), and to ground on off-normal ground conductor 712.

Relay ID(8), in operating, interrupts the previously traced energizing path for relay HST(8), which releases. Relay HST(8), in releasing, interrupts the previously traced circuit including the winding of relay IB(8), thereby releasing relay IB(8).

*Establishing path to called line*

Relay ID(8), in operating, removes, at its No. 5 contact, the ground previously applied to conductor 829 which extends to the common release and time-out circuit of Fig. 1. That circuit responds to this signal to condition the line and line-link circuit for establishing a connection from the called party's line to the selected junctor. Relay ID(8), in operating, also transmits a signal through the selected junctor to the line and line-link circuit over a path from negative battery, resistor 830, No. 9 contact of relay ID(8), conductor 831 which is cabled to Fig. 2, extends through the operated register connector and is then cabled to the selected junctor (Fig. 1), is extended through that junctor, and is then cabled to the line and line-link circuit (Fig. 1).

The line and line-link circuit is operative in response to these signals to extend the called party's line to the junctor where the tip, ring and sleeve conductors appear as conductors 121, 122 and 103, respectively. The called subscriber's tip conductor 121 then extends through the No. 3 contact of unoperated relay RF(1), No. 3 contact of unoperated relay TK(1), upper winding of supervisory relay CS(1), and to ground. The called subscriber's ring conductor 122 is extended through the No. 7 contact of relay RF(1), No. 11 contact of relay TK(1), lower winding of supervisory relay CS(1), and to negative battery.

The line and line-link circuit then connects positive 100-volt battery to conductor 123 which is cabled to the junctor. This potential on conductor 123 is then extended through the No. 7 contact of relay BY(1), conductor 124 which is extended through the operated register connector and to Fig. 8, No. 7 contact of operated relay ID(8), conductor 832, resistor 729, and through resistor 730 to ground whereby a positive potential is applied to the right-hand control anode of tube VCK(7). The right-hand control cathode of tube VCK(7) is connected to ground through resistor 731. Positive 135-volt battery is connected through the winding of relay CK(7), resistor 732, conductor 733, No. 9 contact of operated relay SR(5), and through conductor 584 to the left-hand main anode of tube VCK(7). Negative battery is connected through resistor 734, No. 4 contact of unoperated relay TK0(7), conductor 735 which extends to Fig. 10, No. 5 contact of relay T(10), No. 3 contact of relay OPR(10), conductor 1020 which extends to Fig. 7, No. 7 contact of relay RC(7), conductor 736, and through resistor 737 to ground whereby a negative potential is applied to the main cathode of tube VCK(7). Tube VCK(7) will therefore undergo a control gap discharge and first and second transfers and relay CK(7) will be operated. Relay CK(7), in operating, connects ground through the No. 2 contact of operated relay ON1(7), conductor 738, resistor 739, No. 7 contact of relay CK(7) to conductor 733, thereby locking relay CK(7) operated and extinguishing tube VCK(7). Relay CK(7), in operating, also interrupts, at its No. 1 contact, the circuit by means of which capacitor 707 was connected to the winding of relay SR(5), thereby making relay SR(5) less slow to release. Relay CK(7), in operating, also interrupts, at its No. 5 contact, the previously traced energizing path for relay DC1(7) and that relay releases.

*Communication with the ringing circuit*

As a result of the determination that the called line is idle, the common release and time-out circuit (Fig. 1) applies positive battery to conductor 126 which extends to Fig. 7, No. 7 contact of unoperated relay TK0(7), conductor 743, No. 11 contact of operated relay ID(8), conductor 834 which extends to Fig. 2, No. 5 contact of operated number-group connector relay NGC(2), and to conductor 219 which extends through certain other closed contacts (not shown) in the number-group connector circuit. The positive potential on conductor 219 is then extended over a path through all of the provided ringing circuits which are idle (only one of which is shown in Fig. 2), and to the ringing connector. The ringing connector is operative in response to this signal to select one of the available ringing circuits, here assumed to be the ringing circuit represented in Fig. 2, in a manner fully disclosed in the above-cited patent of W. A. Cornell et al.

It will be recalled that the fourth or ringing code digit of the called subscriber's number was not only counted in the counting chain tubes of Fig. 4, but was also stored therein. The ringing connector functions at this time to operate certain relays (not shown) in the number-group connector circuit to close a plurality of paths over which the information stored in the tubes of Fig. 4 may be communicated to the ringing circuit. It has been assumed that the ringing code digit of the present called subscriber's number is "2" whereby counting chain tube R27(4) is conducting, and the main cathode of that tube is at a potential considerably more positive than the potentials of the other counting chain tubes. This positive potential is transmitted through conductor 441, No. 3 contact of unoperated relay RA5(4), conductor 447 which is cabled to Fig. 2, No. 9 contact of operated relay NGC(2), through the contacts of the relays (not shown) now operated by the ringing connector, and to the ringing circuit. In a similar fashion for any other ringing code digit, the ringing code information is transferred to and stored in the ringing circuit.

A circuit is now completed for the operation of the ringing connector hold magnet HOLD(2). The ringing circuit connects a ground potential through the No. 18 contact of relay NGC(2), conductor 221 which is extended to Fig. 7, No. 3 contact of operated check relay CK(7), conductor 744 which is extended through the operated register connector (Fig. 1) and to the ringing connector (Fig. 2), winding of ringing connector hold magnet HOLD(2), and to battery.

The ringing connector hold magnet HOLD(2), in operating, operates the ringing connector in a manner fully disclosed in the above-cited patent of W. A. Cornell et al. As a result, the subscribers' tip and ring conductors 115 and 117 are disconnected from conductors 201 and 202 which extend to the register as above described, and are connected to conductors 222 and 223, respectively, which are extended through the operated ringing connector to the ringing circuit.

The ringing circuit then locks the ringing connector hold magnet HOLD(2) operated, and transmits ringing current over conductors 222 and 223 in the manner fully disclosed in the above-cited application of W. A. Cornell et al.

The preliminary ring tubes and associated circuits shown in Fig. 3 of the drawing are disclosed and claimed in the application of Hall-Korn-Powell, Serial No. 134,108, filed concurrently herewith.

*Release of register*

It will be recalled that with relay CO(1) in the junctor operated, the calling subscriber's ring conductor was extended through a back contact of ringing connector hold magnet HOLD(2) and through the lower winding of relay L(5) in the register, to battery. When, therefore, the ringing connector is connected to the junctor upon the operation of hold magnet HOLD(2), the calling subscriber's tip and ring conductors are extended to the ringing circuit, and relay L(5) is released. The release of relay L(5) interrupts the energizing path for relay SR(5). Relay SR(5) releases normally since capacitor 707 has been disconnected from its winding by the operation of relay CK(7) as above described. Relay SR(5), in releasing, removes main anode battery from all of the tubes shown in Figs. 3 to 6, inclusive, removes the charging battery from capacitor 553 by means of which a potential was applied to the left-hand control anode of tube RA1(5), and also removes the positive battery from the windings of relay AD(5) and that relay releases. The removal of main anode battery extinguishes any of those tubes in Figs. 3 to 6 which were conducting and removes the "keep-alive" potential from those tubes therein which are provided with keep-alive circuits. The extinguishing of tube RA1(5) releases relay RA1(5). The removal of main-anode battery extinguishes all conducting tubes in the counting chain and all conducting tubes of the hundreds, tens and units storing tubes, which, in the assumed case, are tubes R27(4), H27(6), T38(6), U16(6), and UA5(6). The extinguishing of tube UA5(6) releases relay UA5(6).

Relay SR(5), in releasing, also connects ground through its No. 3 contact to conductor 586 which extends to Fig. 2, No. 20 contact of operated relay NGC(2), conductor 534 which extends to Fig. 7 and is then cabled to the common release and time-out circuit (Fig. 1).

The common release and time-out circuit responds to this signal to perform certain restoring operations in the line and line-link circuit, and releases relay NGC(2) which releases the number-group connector and number-group circuit, including the operated one of the units translator relays U16(2) to U50(2) and the operated one of the tens translator relays T16(2) to T50(2).

Relay SR(5), in releasing, also interrupts the locking path to release relay ON(5). Relay ON(5), in releasing interrupts, at its No. 7 contact, the operating path for relay CO(1) in the junctor, and that relay, in releasing, reconnects the calling subscriber's tip and ring conductors through the windings of supervisory relay S(1) whereby that relay is operated. The interruption of the operating path for relay CO(1) also interrupts the operating path for the register connector which releases.

Relay ON(5), in releasing, also interrupts, at its No. 8 contact, the locking path for the operated class-of-service relays in Fig. 10. Relay ON(5), in releasing, also interrupts the previously traced circuits to release relays DC(5), CK(7), ID(8) and TMA(9).

It may therefore be seen that when the ringing connector hold magnet is operated to indicate to the circuits that a path to the called subscriber has been selected and established and that the ringing circuit has received the necessary ringing-code-digit information, the register, the register connector, the number-group and the line-link circuits are all restored to normal whereby another call may be originated or terminated while ringing proceeds.

The remaining circuits function and are released in accordance with the disclosure of the above-cited patent of W. A. Cornell et al.

*Revertive call*

Let it now be assumed that the functioning of the circuits has proceeded as above described down to the point at which the idle-busy-vacant test is to be made. Let it further be assumed that the called line tests busy whereby both "idle-busy" relay IB(8) and "busy" relay BY(8) will be operated as above mentioned.

Relay IB(8), in orperating, interrupts the energizing circuit for relay VAC(8) before that relay has had sufficient time to operate, and thus no vacant line indication is given as before discussed. Relays IB(8) and BY(8), in operating, complete a circuit from negative battery, winding of relay BY1(7), conductor 745, No. 3 contact of unoperated relay ID(8), conductor 836, No. 2 contact of operated relay BY(8), conductor 825, No. 1 contact of operated relay IB(8), conductor 822, No. 7 contact of relay RT(8), and to ground on off-normal ground conductor 712. Relay BY1(7) operates, locks through its No. 4 contact to ground on off-normal ground conductor 712, and closes a circuit from ground through the No. 2 contact of operated relay ON1(7), conductor 738, No. 3 contact of relay RC(7), conductor 746, No. 3 contact of operated relay BY1(7), conductor 747, which is extended through the operated register connector (Fig. 2) and to the junctor (Fig. 1), winding of relay BY(1), and to battery whereby relay BY(1) is operated.

Since the busy indication may be due to a reverting call, i. e., one in which the calling and called parties are on the same line, a revertive test is made. Therefore, relay BY1(7), in operating, also completes a circuit from positive 135-volt battery through the winding of "revertive call" relay RC(7) to conductor 748 which extends to Fig. 10. Assuming the calling party's class-of-service to be either "flat-rate" or "grounded line," either relay FR(10) or relay GL(10) will be operated as hereinbefore described. The battery on conductor 748 will therefore be extended through the No. 4 contact of operated relay FR(10) or through the No. 6 contact of relay GL(10), conductor 1021, No. 5 contact of operated relay BY1(7), conductor 749 which is extended through the operated register connector and to the junctor (Fig. 1), No. 1 contact of operated relay BY(1), and to the left-hand main anode of "verification" tube VF(1).

Relay BY(1), in operating, also completes a circuit from ground through its No. 6 contact, conductor 124 which is extended through the operated register connector and to Fig. 8, No. 8 contact of unoperated relay ID(8), conductor 837, No. 2 contact of operated relay BY1(7), conductor 750, No. 6 contact and winding of relay RT(8), and to battery. Relay RT(8) operates and locks through its No. 5 contact to ground on off-normal ground conductor 712. Relay RT(8), in operating, completes a charging path for capacitor 839 over a path from positive battery, resistor 840, Nos. 3 and 2 contacts of relay RT(8), capacitor 839, and to ground. It may be noted that capacitor 839 is normally discharged, when relay RT(8) is released, through resistor 841. As capacitor 839 charges, a rising potential is applied over conductor 842, No. 7 contact of relay NT1(8), conductor 832, resistor 729 and to ground through resistor 730 whereby a rising positive potential is applied to the right-hand control anode of tube VCK(7). The time constant of the circuit is such that tube VCK(7) is not discharged for a time sufficient for a revertive test to be made.

Referring now to Fig. 10, it will be noted that capacitor 1024 is normally positively charged from positive 135-volt battery, resistor 1025, which has a high value of resistance, capacitor 1024, and to ground. Therefore, when relay RT(8) operates, a positive pulse is transmitted from capacitor 1024 through resistor 1026, No. 5 contact of relay GL(10) or of relay FR(10), conductor 1027 which extends to Fig. 7, No. 3 contact of relay TK0(7), conductor 751, No. 3 contact of relay VAC(8), conductor 843, No. 10 contact of unoperated relay ID(8), conductor 844, No. 8 contact of operated relay RT(8), to conductor 815 which is extended via the number-group circuit to the line and line-link circuit as above described. The line and line-link circuit forwards this pulse to the junctor with which the "busy" called line is associated, over the called subscriber's sleeve lead. If the called subscriber's station and the calling subscriber's station are on the same line, i. e., if it is a reverting call, as is assumed, this positive pulse will be received at the junctor which has previously been seized by the calling party, that is, the junctor shown in Fig. 1. The positive pulse will, therefore, appear on sleeve conductor 103 and will be transmitted through the No. 5 contact of relay RS(1), and a major portion of that pulse will pass by the network comprising inductor 113 and capacitor 128 and will be applied through resistor 129 to the left-hand control anode of tube VF(1). Since the left-hand control cathode of that tube is connected to negative battery through the network comprising resistors 130 and 131 and capacitor 132, and since the main cathode of that tube is connected to negative battery through resistor 133, a control gap discharge and first and second transfers will immediately occur whereby conduction will exist between the left-hand main anode and the main cathode of tube VF(1). It may be noted that the firing of this tube is aided by the presence of a "keep-alive" circuit including the right-hand control electrodes of the tube. It may also be noted that had this not been a revertive call, the called subscriber's line would have been associated with a different junctor and the positive pulse would have been applied to the left-hand control anode of the VF tube in that junctor, but no transfers would have occurred in that tube since there would be no supply of main anode battery thereto.

Since relay RC(7) is in the circuit of the left-hand main anode of tube VF(1), relay RC(7) will operate and will lock through its No. 4 contact, conductor 738, No. 2 contact of relay ON1(7) and to ground. This ground will also extinguish tube VF(1). Relay RC(7), in operating, interrupts the previously traced energizing path for relay BY(1) in the junctor to release that relay. Relay RC(7), in operating, also connects positive battery through resistor 755, through its No. 5 contact, conductor 834 which extends through the idle ringing circuits to the ringing conductor whereby one of the ringing circuits is selected as hereinbefore described.

During the time that the above revertive test is being made, capacitor 839 in the control anode circuit of tube VCK(7) is charging as hereinbefore mentioned. The time constant of this circuit is arranged to be longer than the time required to operate relay RC(7) if that relay is to operate at all. It may be noted that if the result of the revertive test is affirmative, i. e., if it is indeed a revertive call, relay RC(7) is operated, whereas if the result is negative, relay RC(7) will not be operated. It has been assumed that this is a revertive call, and relay RC(7) has been operated as above described.

After a suitable delay interval, capacitor 839 becomes sufficiently charged to cause tube VCK(7) to discharge across its right-hand control gap. As previously described, the left-hand main anode of tube VCK(7) is connected to positive battery through a front contact of relay SR(5) and through the winding of relay CK(7). It will be recalled that in the previous discussion where the called line was assumed to be idle, relay RC(7) was not operated and the main cathode of tube VCK(7) was connected to negative battery through a back contact of relay TK0(7). In the case of a revertive call, however, with relay RC(7) operated, the main cathode of tube VCK(7) is connected via conductor 736, through the No. 6 contact of operated relay RC(7), conductor 856 which is extended through the number-group connector relay NGC(2) and to negative battery through the winding of a revertive-ringing control relay in the ringing circuit. Therefore, tube VCK(7) will undergo first and second transfers whereby relay CK(7) and the relay in the ringing circuit will be operated.

Relay CK(7) locks operated, extinguishes tube VCK(7), releases relay CD1(7), removes capacitor 707 from the winding of relay SR(5), so that relay SR(5) will be less slow to release, and discharges capacitor 707 through resistors 706 and 772. As previously described, relay CK(7), in operating, operates the ringing connector hold magnet HOLD(2) over a path from a ground in the ringing circuit.

As described above in relation to the first call, the ringing connector is thereby operated to associate the ringing circuit with the junctor. The operation of the ringing connector hold magnet HOLD(2) also interrupts, at its back contacts, the circuit from the calling subscriber's tip conductor to ground through winding 523 of the repeat coil in the register, and the circuit from the calling subscriber's ring conductor to negative battery through winding 524 of the repeat coil and through the lower winding of relay L(5), and relay L(5) is thereby released.

Upon the release of relay L(5), relays SR(5), ON(5) and ON1(7) release in cascade as described in relation to the previous call. Relay SR(5), in releasing, removes main anode battery to extinguish those tubes in the register which are conducting as previously described. The removal of main anode battery also allows relay AD(5) to release. As in the previous description, relay SR(5), in releasing, also connects ground through to the common release and time-out circuit which responds to perform certain restoring functions culminating in the release of the number-group and number-group connector circuits and in the release of the register and register connector as above described. It may be noted that in the restoring of the register to normal, relay ON1(7), in releasing, releases relay BY1(7), RC(7), and RT(8). The circuits thereafter function and are released in accordance with the disclosure of the above-cited patent of W. A. Cornell et al.

*Called line busy*

If, in the above discussion, the line is found to be busy, but the result of the revertive test is negative, i. e., the called and calling subscribers' lines are not common, tube VF(1) in the disclosed junctor will not be fired and relay RC(7) will not be operated. With relay RC(7) unoperated, the only one of the previously traced paths over which ground was applied to conductor 107 to hold relay CO(1) in the junctor operated is through the No. 4 contact of relay CK(7). Therefore, when capacitor 839 becomes sufficiently charged, tube VCK(7) will fire operating relay CK(7) and ground will be removed from conductor 107. Relay CO(1) in the junctor will thereby be released. The removal of ground from conductor 107 and the opening of the No. 4 contact of relay CO(1) removes the ground from conductor 112 by means of which the register connector was held operated. The register connector and register will thereby be released. The circuits function to transmit "busy tone" to the calling subscriber and are released in accordance with the disclosure of the above-cited patent of W. A. Cornell et al.

*Called line vacant*

As above discussed in regard to the first call described, the idle-busy-vacant test is initiated by the number-group connector relay NGC(2) operating relay HST(8) through back contacts of relays ID(8) and VAC(8). In addition to the functions performed in relation to the idle and busy tests, as described above, relay HST(8), in operating, also completed a circuit from ground on off-normal ground conductor 712, No. 7 contact of relay RT(8), conductor 822, armature and No. 2 contact of unoperated relay IB(8), conductor 823, inner front contact of relay HST(8), conductor 824, winding of relay VAC(8), and to negative battery. As before indicated, relay VAC(8) is slow to operate whereby if the called line is either idle or busy, relay IB(8) will operate prior to the operation of relay VAC(8) whereby the energizing circuit for relay VAC(8) will be interrupted. If, however, the line is vacant, relay IB(8) can not operate, and, after the requisite interval, relay VAC(8) will operate. Relay VAC(8), in operating, locks through its No. 4 contact to ground on off-normal ground conductor 712, interrupts at its No. 1 contact the locking path for relay ID(8) to prevent that relay from being locked operated, interrupts at its No. 2 contact the previously traced energizing path for relay HST(8) to release that relay, and completes a circuit from ground through its No. 6 contact, conductor 747 which is extended through the operated register connector (Fig. 1) and to the junctor, winding of relay BY(1) and to battery whereby relay BY(1) is operated. Relay BY(1), in operating, returns ground to the register to operate relay RT(8) as in the revertive call above described. Relay RT(8) locks operated and applies a rising potential from capacitor 839 to the right-hand control anode of tube VCK(7) as previously described. Tube VCK(7) fires to operate relay CK(7) which locks operated and extinguishes tube VCK(7). Since relay VAV(8) is operated, the only path over which ground is extended to the upper winding of relay CO(1) and to hold the register connector operated is through the No. 4 contact of relay CK(7), and therefore, upon the operation of relay CK(7), relay CO(1) is released and the register connector is restored to normal. The junctor is thus in the same condition as in a busy call. The release of the register connector restores the register to normal which signals the common release circuit, and that circuit releases the number-group circuit and restores itself to normal as previously described. When the calling subscriber receives busy tone and disconnects, the junctor and line and line-link circuits are restored to normal, as is fully described in the above-cited patent of W. A. Cornell et al.

*Outgoing trunk call to zero operator*

Although the principles of this invention may be applied in a variety of systems, the preferred embodiment of the invention is representatively disclosed as comprising a part of the system disclosed in the above-cited patent of W. A. Cornell et al. That system is designed to be fully automatic and unattended. Therefore, an operator may be reached only through one of a plurality of trunk circuits, one of which is represented in Fig. 1.

When a party desiring to signal the "zero" operator closes his switchhook contacts, the register is seized as above described. Upon seizure, the register causes the operation of the common release circuit which prepares the line and line-link circuit for handling other calls as before mentioned. The register transmits dial tone to the calling subscriber, and the subscriber dials the digit "0." The register functions as before described with relay RA(5) operating and the ten pulses representing the digit "0" being counted on the counting chain of Fig. 4, tubes R50(4) and RA5(4) thereof finally conducting. Preliminary pulse absorbing is accomplished as above discussed, and when the digit "0" is received in the register, relay AD(5) will be operated since more than one pulse was received. As previously described, relay P1(3) is operated at the first pulse of the first digit, and upon the operation of relay RA1(5) during the delay following the receipt of this first digit, negative battery is connected through front contacts of relays RA1(5), AD(5) and P1(3) to conductor 306 whereby a negative potential is applied to the left-hand control cathodes of the hundreds storing tubes H16(6) to HA5(6), and tubes H50(6) and HA5(6) therein are discharged to store the hundreds digit "0." Since relay RA5(4) is operated as a result of the conduction through tube RA5(4), the negative potential on conductor 306 is also extended through the No. 11 contact of operated relay RA5(4), and through resistor 448 to ground whereby a negative potential is applied through resistor 449 to conductor 450. The negative potential on conductor 450 is applied to the left-hand control cathodes of trunk tubes TK7(7), TK9(7) and other similar trunk tubes (not shown) for a purpose hereinafter to be described. The negative potential on conductor 450 is also applied through the No. 9 contact of relay OPR(10), conductor 1030, and through resistor 453 to ground whereby a negative potential is applied to the right-hand control cathode of tube TK0(4). Main anode battery is supplied to tube TK0(4), and also to tubes TK7(7) to TK9(7) ant to tube NT(8), over conductor 454, resistor 455 and conduitor 892 which is supplied with positive 135-volt battery through the contacts of relay SR(5) as hereinbefore described. With tube R50(4) conducting, the main cathode of that tube will rise in potential, and this potential is applied through conductor 440 and through resistor 456 to the right-hand control anode of tube TK0(4). Tube TK0(4) will undergo a discharge across its right-hand control gap and a first transfer. Negative battery is connected to the main cathode of tube TK0(4) through the winding of relay TK0(7) via conductor 457. Therefore, tube TK0(4) will undergo a second transfer and relay TK0(7) will be operated.

Relay TK0(7), in operating, connects ground through its No. 2 contact, conductor 559, and through the winding of relay RA1(5) to battery whereby relay RA1(5) is operated. Consequently, the register can not be further advanced and any further digits which might be dialed are not recorded. Relay TK0(7), in operating, also connects ground on off-normal ground conductor 712 through its No. 1 contact, conductor 579, to the winding of relay DC(5) and to battery. Relay DC(5) operates and locks to ground on off-normal ground conductor 712 through its No. 6 contact. Relay DC(5), in operating, operates relay DC1(7) over a path including a back contact of relay CK(7) as hereinbefore described. Relay DC1(7), in operating, calls in the common release and time-out circuit to initiate the terminating phase of the call as hereinbefore described. The number-group connector relay NGC(2) is operated and the register responds thereto to perform the idle-busy-vacant test as above described.

Assuming for the moment that all of the provided trunk circuits are busy, relays BY(8) and IB(8) will both be operated as on a regular busy condition as hereinbefore described. Relays BY(8) and IB(8), in operating, operate relay BY1(7) which operates relay BY(1) which, in turn, operates relay RT(8) as hereinbefore described. Relay RT(8), in operating, causes a rising voltage to be applied to the right-hand control anode of tube VCK(7) from capacitor 839. However, a revertive test is not made on a busy call to an "0" operator's trunk since the revertive test lead is opened at the No. 3 contact of operated relay TK0(7). When capacitor 839 becomes sufficiently charged, tube VCK(7) will undergo a control gap discharge and a first transfer. The main cathode of tube VCK(7), under these conditions, is connected via conductor 736, No. 7 contact of unoperated relay RC(7), conductor 1020, No. 3 contact of relay OPR(10), No. 5 contact of relay T(10), conductor 735, No. 5 contact of operated relay TK0(7), conductor 757, No. 6 contact of operated relay BY1(7), resistor 758, and to negative battery. Therefore, tube VCK(7) will undergo a second transfer, and relay CK(7) will be operated. Relay CK(7), in operating, locks to off-normal ground and extinguishes tube VCK(7) as before explained.

With relay TK0(7) operated, the only path over which ground is extended to energize relay CO(1) in the junctor and to hold the register connector operated is through the No. 4 contact of relay CK(7), and therefore, upon the operation of relay CK(7), relay CO(1) will be released as will the register connector. Therefore, the register connector, the register, and the number group will be released and restored to normal, and busy tone will be sent to the calling subscriber in the manner fully dislosed in the above-cited patent of W. A. Cornell et al.

Assuming now that one or more of the trunk circuits is idle, relay IB(8) only will be operated as on a regular idle line. Relay IB(8), in operating, operates relay ID(8) which locks to off-normal ground.

Relay ID(8), in operating, signals the line and line-link circuit as above described, and that circuit operates to establish a connection from the employed trunk circuit (Fig. 1) to the selected junctor (Fig. 1). When this connection is completed, the line and line-link circuit transmits positive battery over the previously traced path through the junctor and through the No. 7 contact of operated relay ID(8) to the right-hand control anode of tube VCK(7). The main anode of tube VCK(7) is connected to positive battery through the winding of relay CK(7), and, with relay TK0(7) operated, the main cathode of tube VCK(7) is connected via conductor 736, No. 7 contact of relay RC(7), conductor 1029, No. 3 contact of relay OPR(10), No. 5 contact of relay T(10), conductor 735, No. 5 contact of operated relay TK0(7), conductor 757, No. 7 contact of unoperated relay BY1(7), conductor 769 which is extended through the operated register connector and to the junctor (Fig. 1), winding of relay TK(1) and to negative battery. Therefore, tube VCK(7) will undergo a control gap discharge and first and second transfers and relay TK(1) will be operated. Relay TK(1), in operating, locks through its No. 1 contact, conductor 135, upper front contact of operated relay ON(1) and to ground, and in so doing, increases the current in tube VCK(7) to operate relay CK(7) which locks and extinguishes tube VCK(7) as hereinbefore explained.

Since relay TK0(7) is operated, relay CK(7), in operating, also interrupts, at its No. 4 contact, the only path over which ground is supplied to the upper winding of relay CO(1) and to hold the register connector operated, thereby releasing the register connector. When the register connector is released, relay L(5) is released and the register is restored to normal which causes the common release circuit to function to restore itself and the number-group circuits to normal as hereinbefore described. The functioning of the other circuits on this type of call is fully set forth in the above-cited patent of W. A. Cornell et al.

*Call to trunks other than zero operator*

As above described, any subscriber in the subject system may obtain the services of a "zero" operator through the trunk circuit of Fig. 1. Other distant operators or distant automatic telephone exchanges may also be reached through similar trunk circuits by the dialing of certain selected digits. It may be noted that this may be done either by a subscriber whose line is associated with the subject system or by an operator or subscriber who has reached this exchange through an incoming trunk call, i. e., for tandem purposes.

However, parties subscribing to a "restricted" class of service may not be permitted automatically to obtain the use of these outgoing trunk circuits, being required to place a toll call through the "zero" operator. Provision is made in the subject register to handle calls to a trunk circuit either from "restricted" or "non-restricted" lines.

When the register is seized, one or two of the class-of-service relays of Fig. 10 is operated as previously described. If the call be from a restricted service line, one of the CL-(10) relays will be operated. Thus, if the calling party has subscribed to a class of service known as "message-rate restricted," relay CL2(10) will be operated which operates relay MR(10) and both of these relays are locked operated as above described.

Upon the receipt of dial tone, the calling subscriber dials the digit representing the desired group of trunk circuits, herein assumed to be the digit "7". Assuming for the present that the service to this subscriber is "non-restricted," the circuits then function as on the previously described outgoing trunk call to zero operator except that instead of tube TK0(4) being fired, the rise in main cathode potential of the register counting tube R27(4) is applied via conductor 441, which is carried via cable 459, to the left-hand control anode of tube TK7(7). Since suitable potentials are applied to the left-hand control cathode and main anode of tube TK7(7) as hereinbefore described, this tube will undergo a control gap discharge and a first transfer, and, since the main cathode thereof is connected to negative battery through the winding of relay TK7(7), this tube will also undergo a second transfer whereby relay TK7(7) is operated. Relay TK7(7), in operating, connects ground through its upper front contact to conductor 457 to operate relay TK0(7). The circuits thereafter function as described on the previous outgoing trunk call except that since the hundreds digit is recorded by conduction in tubes H27(6) and HA5(6), the rising main cathode potential will be applied to select the proper group of trunk circuits. The idle-busy-vacant test is then performed on these trunk circuits in a manner similar to that before described in detail. The circuits thereafter function in the manner previously mentioned and in accordance with the disclosure of the above-cited patent of W. A. Cornell et al.

If the calling party has subscribed to the assumed restricted class of service whereby relays CL2(10) and MR(10) are operated, means are operative in the register to prevent the establishment of a connection to one of the trunk circuits in the "7" trunk group. Upon the dialing of the digit "7," the circuits respond as above described, with tube TK7(7) being rendered conductive to operate relay TK7(7). Relay TK7(7) in operating, operates relay TK0(7) as before described, and, in addition, completes a circuit from ground through the No. 3 contact of the operated class-of-service relay CL2(10), conductor 1032 which is cross-connected in Fig. 10 to conductor 1033 which is cabled to Fig. 7, lower front contact of relay TK7(7), conductor 762, winding of relay RS(7) and to battery thereby operating "restricted service" relay RS(7). It will be noted that a plurality of conductors extend from a plurality of contacts of each of the CL-(10) class-of-service relays and these conductors may be cross-connected as desired to the conductors extending through the lower front contacts of the trunk group relays TK7(7), TK9(7) or of other similar relays which may be provided for other trunk groups. Thus, any subscriber's service may be restricted so that calls may not be placed through trunk group "7" by cross-connections in Fig. 10 to conductor 1033 and so that calls may not be placed through trunk group "9" by cross-connecting one of the conductors from that subscriber's CL-(10) relay to conductor 1034, and, in either case, relay RS(7) will be operated. It will be noted that since none of the grounded conductors from the class-of-service relay CL2(10) are cross-connected to conductor 1034, the present subscriber may call a party reached through trunk group "9" without restriction.

Relay RS(7), in operating, closes ground through its No. 1 contact to conductor 745 to operate relay BY1(7) which locks operated. The circuit now operates the same as on a call to a trunk with all trunks within that trunk group busy, as was mentioned in regard to the outgoing trunk call to zero operator. Relay BY1(7) operates relay BY(1) in the junctor which causes the operation of relay RT(8) as previously described. A revertive test is not made since the revertive test lead is open at the No. 3 contact of operated relay TK0(7). Relay RT(8), in operating, fires tube VCK(7) which operates relay CK(7). Relay CK(7), in operating, locks operated, extinguishes tube VCK(7), and releases relay CO(1) in the junctor and releases the register connector. Therefore, the register connector and the register will be restored to normal, busy tone will be transmitted to the calling subscriber, and, upon the replacing of the calling subscriber's receiver upon its hook, the connection will be broken down and the circuits restored to normal in the manner fully disclosed in the above-cited patent of W. A. Cornell et al.

*Busy verification test*

At the request of a subscriber, the "zero" operator may establish a monitoring connection to any line to ascertain whether the line is continuously busy, as it appeared to the requesting subscriber, or whether there was a malfunctioning of the equipment.

To perform this test, the operator seizes a trunk circuit, as for example the trunk circuit shown in Fig. 1, and a connection is established to an idle junctor and to an idle register. Since the call is from "zero" operator, class-of-service relay OPR(10) will be operated. In order for the operator to verify a busy line condition, she must preface the listed number with a preassigned digit, here assumed to be the digit "6."

The register responds, as hereinbefore described to count these pulses, with the result that counting chain tubes R16(4) and RA5(4) are discharged and relay RA5(4) is operated. When relay RA1(5) is operated during the interdigital period, negative battery is connected through the upper front contact of relay P1(3) and to conductor 306 whereby a negative potential is applied to the left-hand control cathodes of the hundreds storing tubes H16(6) to HA5(6) as hereinbefore described. The counted hundreds digit "6" will thereby be stored in tubes H16(6) and HA5(6) in the manner previously explained. This negative potential on conductor 306 is also applied through the No. 11 contact of operated relay RA5(4), resistor 449, conductor 450, through the No. 8 contact of operated relay OPR(10), conductor 1035 and through resistor 846 to ground whereby a negative potential is applied to the right-hand control cathode of tube NT(8). With tube R16(4) conducting, the rise of main cathode potential thereof is applied via conductor 443 to Fig. 8 and through resistor 847 to the right-hand control anode of tube NT(8). Tube NT(8) will therefore undergo a control gap discharge and a first transfer since the main anode thereof is connected to a source of positive voltage as hereinbefore mentioned. Since the main cathode of tube NT(8) is connected to negative battery through the No. 1 contact of relay NT1(8) and through the winding of relay NT(8), that tube will undergo a second transfer and relay NT(8) will be operated. Relay NT(8) locks operated through the No. 1 contact of relay NT1(8) and through its No. 1 contact to ground on off-normal ground conductor 712. Relay NT(8), in operating, completes a circuit from ground through the No. 2 contact of relay OPR(10), conductor 1036, No. 3 contact of relay NT(8), winding of relay NT1(8) and to battery. Relay NT1(8) operates and locks to ground on off-normal ground conductor 712 through the No. 2 back contact of relay ID(8), conductor 848 and through its No. 4 contact. Relay NT1(8), in operating, also releases relay NT(8), but that relay is slow to release by virtue of the shunting network comprising resistor 849 and capacitor 850, and during the period that both relay NT1(8) and relay NT(8) are operated, the previously traced circuits over which positive main anode battery is supplied via conductors 549 and 802 to the main anodes of all the register tubes shown in Figs. 3 to 8 are interrupted. Therefore, the counting and storing tubes and other tubes in the register are extinguished. When relay NT(8) fully releases, the path over which main anode battery is supplied to the tubes is reestablished and the register is in the same condition as it was before any dial pulses were received except that relay NT1(8) is operated. It should be noted that the release time of tube NT(8) must be sufficiently long to allow the tubes to be extinguished, but must be sufficiently short so that the main anode circuits are restored before the pulses representing the first digit of the called subscriber's number are received.

The operator then dials the designation of the desired called party, that number is counted and stored in the register, the common release circuit is operated, the number group is called in, and the idle-busy-vacant test is performed as on a normal call to a line. If the line has become idle before the verification call is made, the operation of relay ID(8) interrupts, at its No. 2 contact, the previously traced locking path for relay NT1(8), which releases, and the call is completed in the regular manner.

Assuming, however, that the called line tests busy, relays BY(8) and IB(8) are operated to operate relay BY1(7) which locks operated as hereinbefore described. Relay BY1(7), in operating, operates relay BY(1) in the junctor which operates "revertive test" relay RT(8) as before described. Relay RT(8) locks operated and starts the charging of capacitor 839, but, it may be noted, this rising potential is not applied to the right-hand control anode of tube VCK(7) at this time since the circuit therebetween is interrupted at the No. 7 contact of operated relay NT1(8).

Relay BY1(7), in operating, also completes a circuit whereby a signal is transmitted to the busy verification circuit (Fig. 1) which may be traced from ground through the No. 3 contact of relay NT1(8), conductor 857, No. 1 contact of operated relay BY1(7), and to conductor 763 which is extended to the busy verification circuit represented in Fig. 1.

The busy verification circuit responds to this signal to establish a connection through itself from the incoming operator's trunk circuit (Fig. 1) to the called subscriber's line at the junctor with which that line is then associated in the manner fully disclosed in the above-cited patent of W. A. Cornell et al.

The busy verification circuit also transmits a ground via conductor 137 which extends to Fig. 8, No. 2 contact of operated relay NT1(8), conductor 858, winding of relay NTK(8) and to battery whereby relay NTK(8) is operated. Relay NTK(8), in operating, completes a circuit from positive 135-volt battery through its No. 3 contact, conductor 1821, No. 5 contact of relay BY1(7), and to conductor 749 which is extended through the operated register connector (Fig. 2), and through the junctor and line and line-link circuit to the trunk circuit (Fig. 1). The trunk circuit responds to this signal to transfer from the junctor to the busy verification circuit. As a result of this transfer, relay L(5) will release as will be mentioned hereinafter.

In the meantime, relay NTK(8), in operating, has also reestablished, through its No. 1 contact, the path from capacitor 839 to the right-hand control anode of tube VCK(7). Since relay RT(8) was previously operated, capacitor 839 will have become completely or very nearly charged, tube VCK(7) will fire and relay TK(1) in the junctor and relay CK(7) will be operated as hereinbefore described. Relay TK(1), in operating, locks relays BY(1) and CO(1) operated.

With relay L(5) released, slow-to-release relay SR(5) will start to release, and upon the operation of relay CK(7) which removes capacitor 707 from the winding of relay SR(5), relay SR(5) will immediately release. Relay CK(7), in operating, also extinguishes tube VCK(7), releases relay DC1(7), and interrupts the ground through the upper winding of relay CO(1) and through to the register connector whereby the register connector is restored to normal. Relays SR(5), ON(5) and ON1(7) release in cascade restoring the register circuit to normal as hereinbefore described.

The circuits thereafter function to establish a monitoring connection and are thereafter released in accordance with the full disclosure in the above-cited patent of W. A. Cornell et al.

*Register time-out*

As described in detail in reference to the first-described call, register time-out is initiated when relay ON1(7) operates and at the end of each digit, whereby if dialing does not commence, if dialing is not completed, or if only a series of preliminary digits "1" are dialed, register time-out will occur. In each of these cases, time-out is initiated by the applying of a rising voltage to one of the control anodes of tube TM(9), and after a suitable interval controlled by the time constants of the networks associated with these control anodes, tube TM(9) will undergo a control gap discharge and first and second transfers whereby relay TM(9) is operated.

Relay TM(9), in operating, completes a circuit from ground on off-normal ground conductor 712, No. 6 contact of relay NGT(9), No. 4 contact of operated relay TM(9), conductor 939, No. 3 contact of relay DC1(7), winding of relay PS(7) and to battery. Relay PS(7), in operating, interrupts, at its No. 1 contact, one of the paths over which ground is supplied to operate relay CO(1) in the junctor and to hold the register connector operated as hereinbefore traced. Relay PS(7), in operating, also closes ground through its No. 3 contact, conductor 747, which is extended through the operated register connector and to the junctor (Fig. 1), winding of relay BY(1) and to battery. Relay BY(1) locks operated and returns ground to operate relay RT(8) as hereinbefore described. It may be noted that since the number-group connector relays have not been operated, the revertive pulse will not be transmitted. Relay RT(8), in operating, completes a charging circuit for capacitor 839 whereby a rising potential is applied to the right-hand control anode of tube VCK(7), and closes ground from off-normal ground conductor 712 through its No. 4 contact, conductor 860, No. 4 contact of operated relay PS(7), conductor 765 which is extended through the operated register connector (Fig. 2) and to the junctor (Fig. 1), to initiate junctor time-out which proceeds in a manner disclosed in the above-cited patent of W. A. Cornell et al.

In the meantime, the potential at the right-hand control anode of tube VCK(7) will have risen to a sufficient value to fire tube VCK(7) which will cause the operation of relay CK(7). Relay CK(7) locks operated, extinguishes tube VCK(7), and since relay PS(7) is operated, interrupts, at its No. 4 contact, the only remaining path over which ground is supplied to the winding of relay CO(1) and to hold the register connector operated, thereby releasing that relay and the register connector. The release of the register connector and the restoration thereof to normal release the register which restores to normal as hereinbefore described in detail, with the addition that upon the release of relay TMA(9), tube TM(9) is extinguished releasing relay TM(9) which, in turn, releases relay PS(7).

Register time-out is also initiated, as mentioned in the discussion of the first-described call, when relay ST1(5) is operated upon the seizure of the register. The operation of relay ST1(5), it will be recalled, closed ground to conductor 518 to operate relays TMA(9) and TMB(9) which created a charging circuit for capacitor 917. If for any reason the tip and ring loop fails to close, or if for any other reason relay ST1(5) fails to release within the requisite interval, tube TM(9) will conduct, operating relay TM(9). Relay TM(9), in operating, completes a path from ground through the No. 2 contact of relay ST1(5), conductor 587 which is cabled to Fig. 9, No. 5 contact of relay TM(9), conductor 527 which is cabled to Fig. 5, resistor 528, winding of relay SR(5) and to battery thereby operating relay SR(5). Relay SR(5), in operating, interrupts, at its No. 2 contact, the locking path for relay ST1(5) and relay ST1(5) releases. Relay ST1(5), in releasing, releases relays TMA(9) and TMB(9). Relay TMA(9), in releasing, extinguishes tube TM(9) which releases relay TM(9). Relay ST1(5), in releasing, also completes a path for the operation of relay ON1(7) as hereinbefore described. Relay ON1(7), in operating, completes a path from ground through the front contact of one of the operated class-of-service relays in Fig. 10 to the common release circuit (Fig. 1) to dismiss that circuit as was mentioned hereinbefore. Relay ST1(5), in releasing, also interrupts, at its No. 2 contact, the previously traced energizing path for relay SR(5) releasing that relay, and relays ON(5) and ON1(7) are thereby released in the same fashion as on a normal disconnect, restoring the register to normal, releasing the register connector, and releasing the junctor which restores to normal as hereinbefore described.

The time-out circuit of Fig. 9 may also be arranged to be operative to release the register in response to a time-out in other circuits of a system. Thus, as shown fully in the above-cited patent of W. A. Cornell et al., a time-out circuit in the common release and time-out circuit of Fig. 1 is operated under the control of the number-group connector relay NGC(2).

If the number-group connector relay NGC(2) fails to release within a predetermined time after a certain condition exists, the aforesaid time-out circuit is operative to connect ground 139 to conductor 140. This ground on conductor 140 is extended either or both through the No. 45 contact of operated number-group connector relay NGC(2) and/or through the front contact of operated relay LO(1) in the common release and time-out circuit (Fig. 1) to conductor 141 which extends to Fig. 9, right-hand winding of relay NGT(9) and to battery. Relay NGT(9) operates and locks operated over a path from negative battery, through its left-hand winding and No. 3 contact, and to ground on off-normal ground conductor 712.

Since prior to the operation of relay NGT(9) relay TMA(9) is operated from ground on off-normal ground conductor 712 and through the right-hand back contact of relay TMB(9), capacitor 917 is being charged from positive battery, resistor 920, No. 1 contact of unoperated relay NGT(9), conductor 921, resistor 922, through capacitor 917 and to negative battery through the No. 2 contact of relay TMA(9). The time constant of this circuit is relatively large as hereinbefore mentioned. Upon the operation of relay NGT(9), resistor 933 is substituted for resistor 920 in this charging path. Resistor 933 is preferably of a considerably lower value of resistance than resistor 920, and therefore, upon the operation of relay NGT(9) capacitor 917 is charged at a more rapid rate. Relay NGT(9), in operating, also interrupts the previously traced energizing path for relay DC1(7) and that relay is released. Relay NGT(9), in operating, also interrupts, at its No. 4 contact, one of the previously traced paths over which ground is supplied to the winding of relay CO(1) and to hold the register connector operated. When tube TM(9) is fired, relay TM(9) is operated. Relay TM(9), in operating, interrupts the other path over which ground is supplied to relay CO(1) and to the register connector, and that relay and the register connector are released.

The release and restoration to normal of the register connector releases the register which, with the exception of the circuits of Fig. 9, restores to normal as described in detail hereinbefore. Upon the release of relay TMA(9), tube TM(9) is extinguished, releasing relay TM(9).

It is to be understood that the above-described arrangements are but illustrative of the application of the principles of the invention. Numerous other arrangements may be devised by those skilled in the art without departing from the spirit and scope of the invention.

What is claimed is:

1. In a counting chain, a plurality of gaseous discharge devices each having an anode, a cathode, and a control electrode, and a resistance-capacitance network connecting the cathode of each of said devices to the control electrode of the next succeeding one of said devices.

2. In a counting chain, a plurality of gaseous discharge devices each having an anode, a cathode, and a control electrode, and means coupling the cathode of each of said devices to the control electrode of the next succeeding one of said devices, said means comprising two resistors and a capacitor in parallel with one of said resistors.

3. In a counting chain, a plurality of gaseous discharge devices each having an anode, a cathode, a control anode and a control cathode, means coupling the cathode of each of said devices to the control anode of the next succeeding one of said devices, and a parallel resistance-capacitance network connecting the control cathode of each of said devices to a source of potential.

4. In a counting chain, a plurality of gaseous discharge devices each having an anode, a cathode, a control anode and a control cathode, means coupling the cathode of each of said devices to the control anode of the next succeeding one of said devices, and a parallel resistance-capacitance network connecting the control cathode of each of said devices to a source of potential, said means comprising two resistors and a capacitor in parallel with one of said resistors.

5. In a pulse-responsive system, means for transmitting a plurality of groups of pulses, storing means comprising a plurality of groups of gaseous discharge devices, counting means for counting said pulses and operative to communicate its instant settings to all of said groups of devices, and means normally disabling all of said devices and effective upon the termination of each of said groups of pulses to successively enable said groups of devices to operate in accordance with the then settings of said counting means.

6. In a pulse-responsive system, means for transmitting a plurality of groups of pulses, storing means comprising a plurality of groups of gaseous discharge devices, counting means for counting said pulses and operative to communicate its instant settings to all of said groups of devices, and means normally disabling all of said devices and effective upon the termination of each of said groups of pulses to successively enable said groups of devices to operate in accordance with the then settings of said counting means and for releasing said counting means.

7. In a pulse-responsive system, means for transmitting a series of pulses, storing means comprising a plurality of gaseous discharge devices each having at least two electrodes, counting means for counting said pulses and operative to apply potentials to one of said electrodes in at least one of said devices in accordance with its instant settings, and means effective upon the termination of said pulses to apply potentials to the other of said electrodes in all of said devices.

8. In a pulse-responsive system, means for transmitting a plurality of groups of pulses, storing means comprising a plurality of groups of gaseous discharge devices each having at least two electrodes, counting means for counting said pulses and operative to apply potentials to one of said electrodes in at least one of said devices in each of said groups of devices in accordance with its instant settings, and means effective upon the termination of each of said groups of pulses to successively apply potentials to the other of said electrodes in all of said devices in successive groups of said devices.

9. In a pulse-responsive system, means for transmitting a plurality of groups of pulses, storing means comprising a plurality of groups of gaseous discharge devices each having at least two electrodes, counting means for counting said pulses and operative to apply potentials to one of said electrodes in at least one of said devices in each of said groups of devices in accordance with its instant settings, and means effective upon the termination of each of said groups of pulses to successively apply potentials to the other of said electrodes in all of said devices in successive groups of said devices and to release said counting means.

10. In a pulse-responsive system, means for transmitting a series of pulses, a first group of gaseous discharge devices successively operable to count said pulses, a second group of gaseous discharge devices each having at least two electrodes, means coupling each of the devices in said first group to one of the electrodes in the corresponding devices in said second group, and means effective upon the termination of said series of pulses to apply potentials to the other of said electrodes in all of the devices in said second group.

11. In a pulse-responsive system, means for transmitting a plurality of groups of pulses, counting means comprising a plurality of gaseous discharge devices successively operable in response to said pulses, storing means comprising a plurality of groups of gaseous discharge devices each having at least two electrodes, means coupling each of said plurality of devices to one of the electrodes in the corresponding devices in each of said groups of devices, and means effective upon the termination of each of said groups of pulses to successively apply potentials to the other of said electrodes in all of said devices in successive ones of said groups of devices.

12. In a telephone switching system, means for transmitting pulses representing the digits of telephonic designations, storing means comprising a plurality of groups of gaseous discharge devices, counting means for counting the pulses representing each of said digits operative to communicate its instant settings to all of said groups of devices, and progress means operative at the end of each digit for successively enabling said groups of devices to operate in accordance with the then settings of said counting means.

13. In a telephone switching system, means for transmitting groups of pulses representing the digits of telephonic designations, a plurality of digit registers each comprising a plurality of gaseous discharge devices, a counting chain comprising a plurality of gaseous discharge devices for counting the pulses representing each of said digits, means coupling each of the devices in said counting chain to the corresponding devices in each of said digit registers, and progress means successively effective upon the termination of successive ones of said groups of pulses to successively enable said digit registers to operate in accordance with the instant settings of said counting chain.

14. In a telephone switching system, means for transmitting groups of pulses representing the digits of telephonic designations, a progress chain comprising a plurality of gaseous discharge devices, and means including a gaseous discharge device effective upon the termination of each of said groups of pulses to successively operate said progress chain gaseous discharge devices.

15. In a telephone switching system, means for transmitting groups of pulses representing the digits of telephonic designations, a progress chain comprising a plurality of gaseous discharge devices, and control apparatus including a gaseous discharge device for successively operating said progress chain devices in response to the receipt of the successive groups of said pulses.

16. In a telephone switching system, means for transmitting groups of pulses representing the digits of telephonic designations, a progress chain comprising a plurality of gaseous discharge devices successively operable in response to received pulses, and apparatus including a gaseous discharge device normally establishing a connection between said means and said progress chain and effective upon the receipt of the first pulse of each of said groups of pulses to disestablish said connection.

17. In a telephone switching system, means for transmitting groups of pulses representing the digits of telephonic designations, a progress chain comprising a plurality of gaseous discharge devices successively operable in response to received pulses, apparatus including a gaseous discharge device normally establishing a connection between said means and said progress chain and effective upon the receipt of the first pulse of each of said groups of pulses to disestablish said connection, and control means including a gaseous discharge device operative at the termination of each of said groups of pulses for releasing said apparatus.

18. In a telephone switching system, means for transmitting groups of pulses representing the digits of telephonic designations, a progress chain comprising a plurality of gaseous discharge devices successively operable in response to received pulses, apparatus including a gaseous discharge device normally establishing a connection between said means and said progress chain and effective upon the receipt of the first pulse of each of said groups of pulses to disestablish said connection, and control means including a gaseous discharge device controlled by said apparatus and effective upon the termination of each of said groups of pulses for releasing said apparatus.

19. In a telephone switching system, first means for transmitting groups of pulses representing the digits of telephonic designations, a first and a second gaseous discharge device, means controlled by said first means for discharging said first device at the first pulse of each of said groups of pulses, and means controlled by said first means and effective upon the firing of said first device for firing said second device at the termination of each of said groups of pulses.

20. In a telephone switching system, first means for transmitting groups of pulses representing the digits of telephonic designations, control apparatus including a first gaseous discharge device effective upon the receipt of the first pulse of each group of pulses transmitted by said first means, a second gaseous discharge device, second means for applying a discharge-initiating potential to said second device, means including said first means and said control apparatus for normally disabling said second means and controlled by said first means effective upon the termination of each of said groups of pulses for enabling said second means, and means controlled by said second device for releasing said control apparatus.

21. In a telephone switching system, a relay operative in response to each pulse of a plurality of groups of pulses representing the digits of telephonic designations, control apparatus including a gaseous discharge device controlled by the first operation of said relay, a second gaseous discharge device, means controlled by said control apparatus and effective while said relay is unoperated during the time following each of said groups of pulses, apparatus including a capacitor controlled by said means for applying a discharge-initiating potential to said second device, and means controlled by said second device for releasing said control apparatus.

22. In a telephone switching system, means for transmitting groups of pulses representing the digits of telephonic designations, pulse counting means, apparatus normally operative to connect said means to said pulse counting means, and means including a gaseous discharge device effective when said pulse counting means is in certain of its settings to disable said apparatus.

23. In a telephone switching system, means for transmitting groups of pulses representing the digits of telephonic designations, pulse counting means comprising a plurality of gaseous discharge devices successively operable in response to received pulses, apparatus normally operative to connect said means to said pulse counting means, a gaseous discharge tube, means coupling said tube to a selected one of said devices whereby conduction in said selected one of said devices will initiate conduction in said tube, and means controlled by conduction in said tube for disabling said apparatus.

24. In a telephone switching system, a pulse transmitter, pulse counting means connected to said transmitter and operative to assume any of a plurality of settings in accordance with the number of pulses transmitted, a digit register normally operable to record the instant settings of said pulse counting means, and means including a gaseous discharge device connected to said pulse counting means and effective when said pulse counting means is in a certain one of its settings for releasing said digit register.

25. In a telephone switching system, means for transmitting pulses representing the digits of telephonic designations, pulse counting means, a plurality of digit registers normally successively operable to store the successive digital representations recorded in said counting means, and means including a gaseous discharge device effective when said counting means is in a selectable one of its settings for disabling said digit registers to store the first digital representation.

26. In a telephone switching system, means for transmitting pulses representing the digits of telephonic designations, pulse counting means, a plurality of digit registers normally successively operable to store the successive digital representations recorded in said counting means, and means including a gaseous discharge device effective when said counting means is in a selectable one of its settings for momentarily disabling the first of said digit registers to store the first of said digital representations and for releasing said pulse counting means.

NATHAN I. HALL.
GEORGE HECHT.
CHARLES D. KOECHLING.

References Cited in the file of this patent

UNITED STATES PATENTS

| Number | Name | Date |
|---|---|---|
| 1,498,544 | Fowler | June 24, 1924 |
| 2,404,918 | Overbeek | July 30, 1946 |
| 2,411,441 | Leroy | Nov. 9, 1946 |
| 2,417,831 | Kinkead | Mar. 25, 1947 |
| 2,422,523 | Mumma | June 17, 1947 |
| 2,428,089 | Mumma | June 30, 1948 |
| 2,438,492 | Bascom | Mar. 30, 1948 |
| 2,452,051 | Hershey | Oct. 26, 1948 |
| 2,462,613 | Desch et al. | Feb. 22, 1949 |
| 2,487,781 | Bascom et al. | Nov. 15, 1949 |
| 2,515,448 | Gulden | July 18, 1950 |